INVENTOR.
GORDON GOULD
BY Darby & Darby
ATTORNEYS

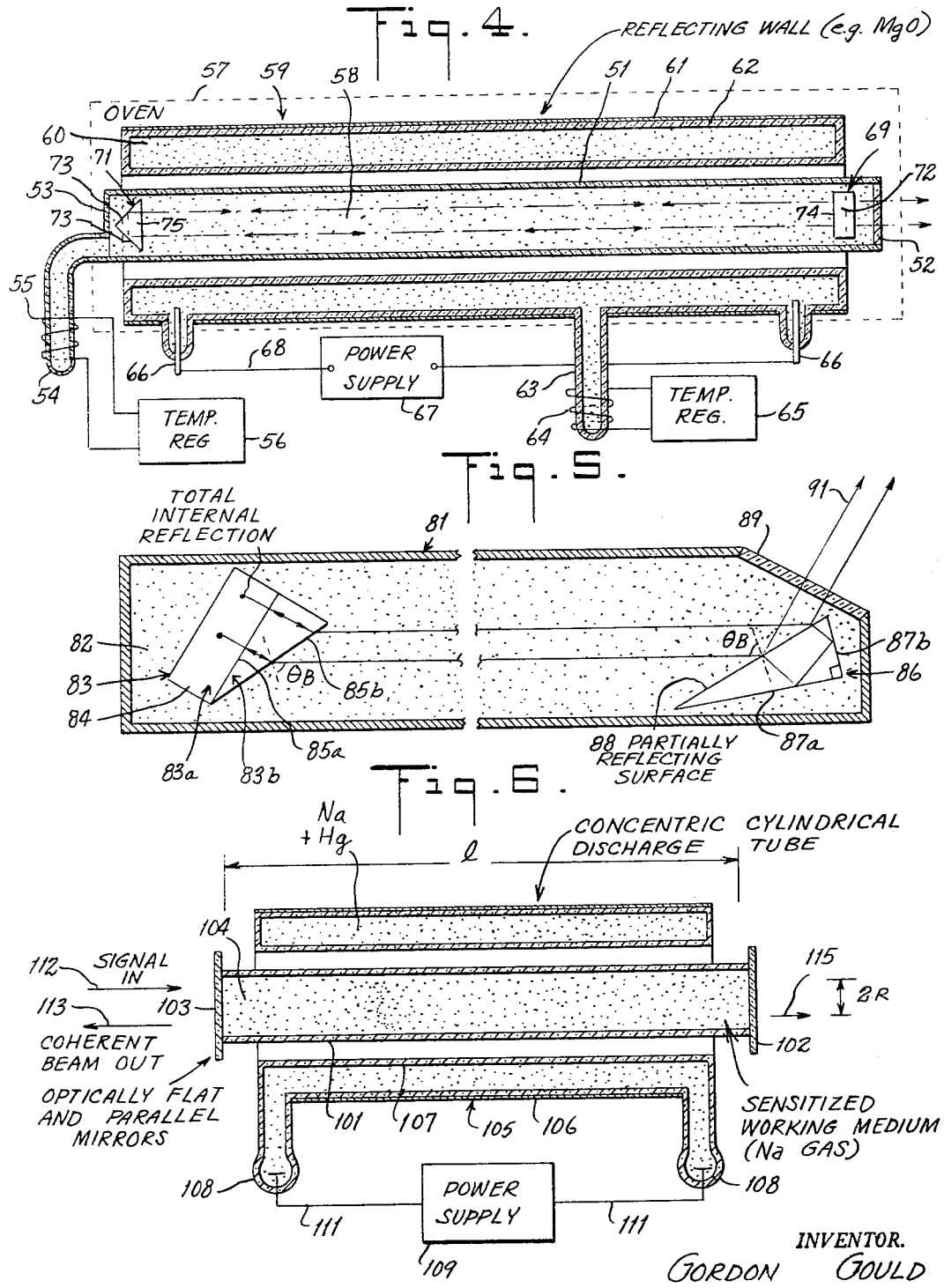

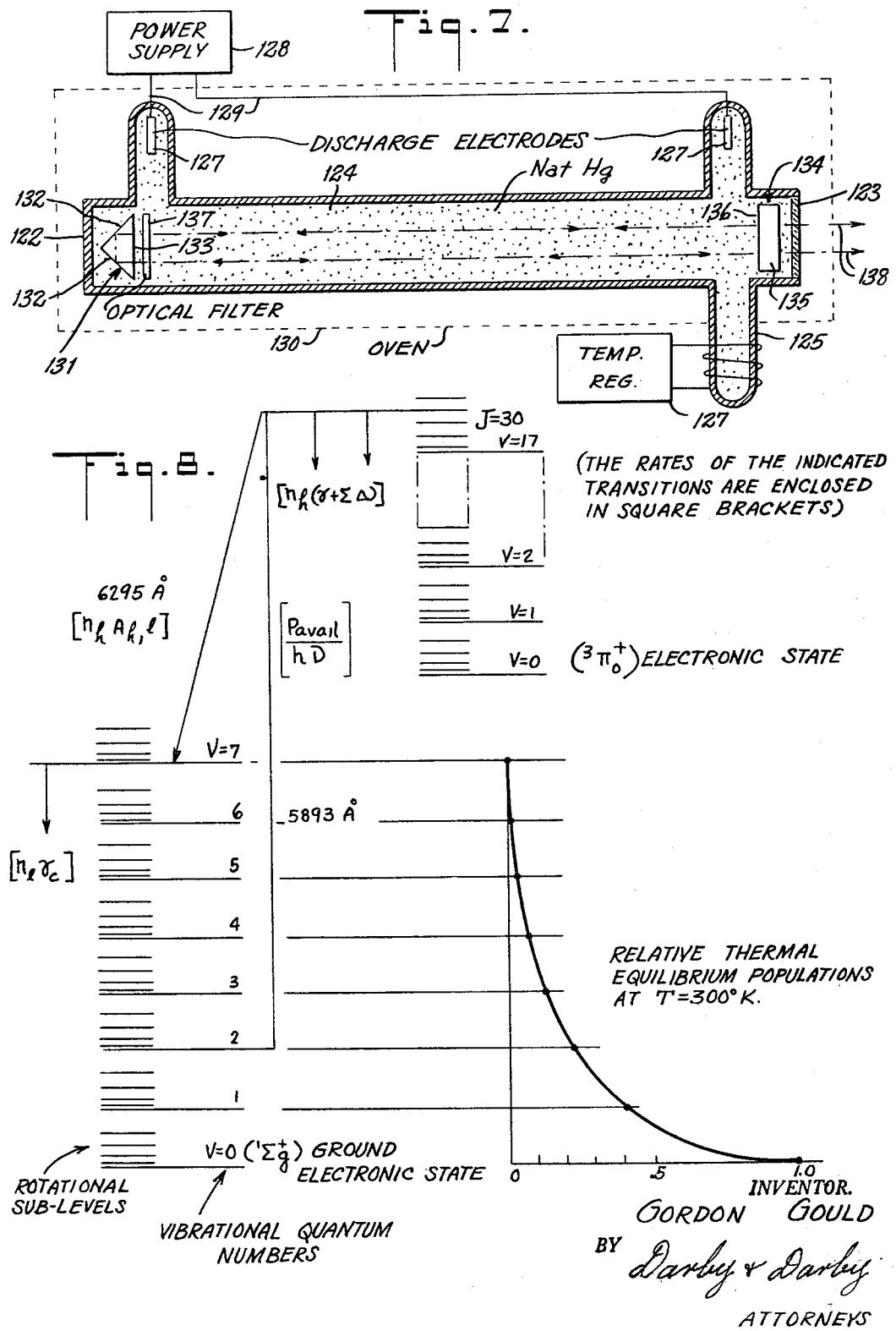

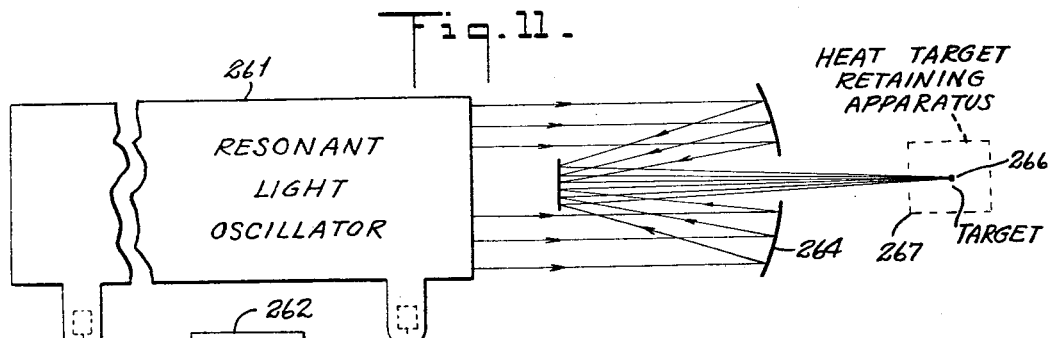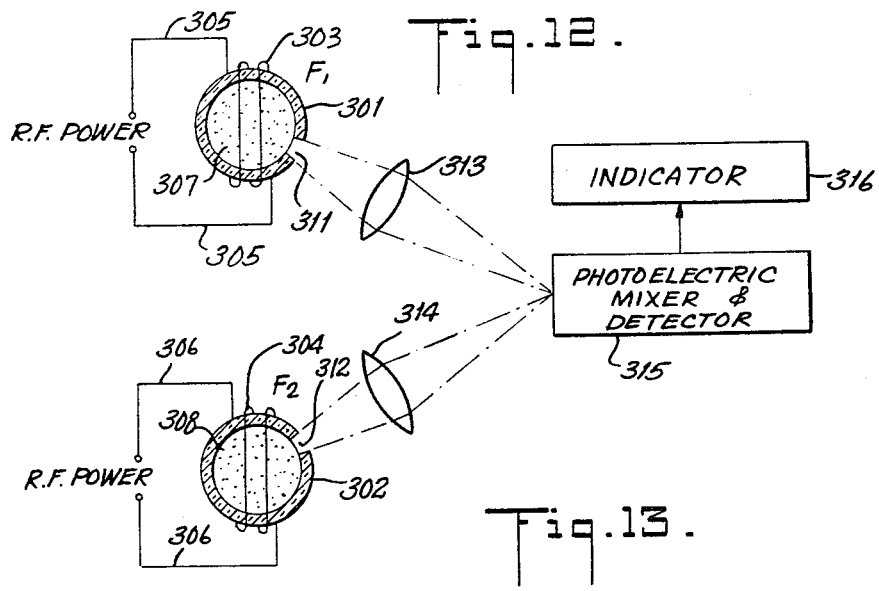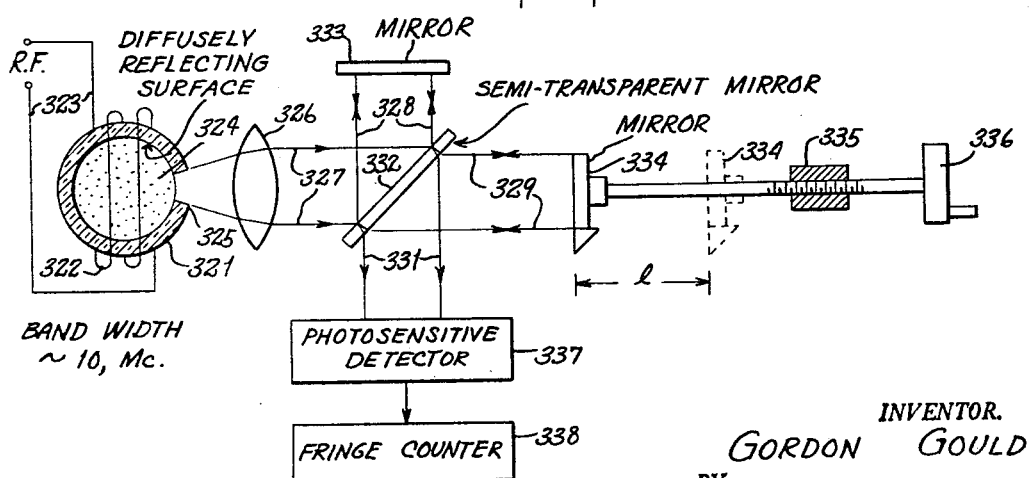

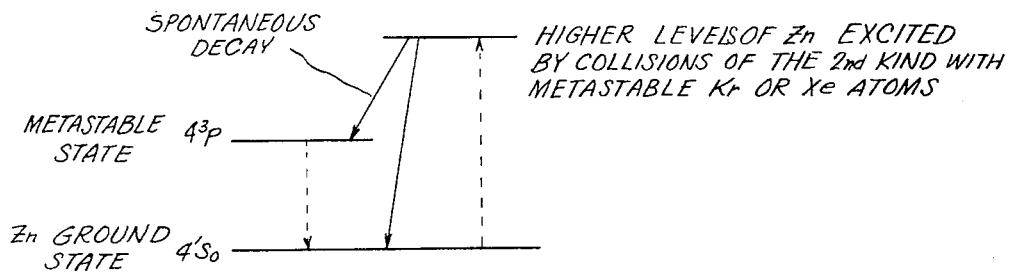
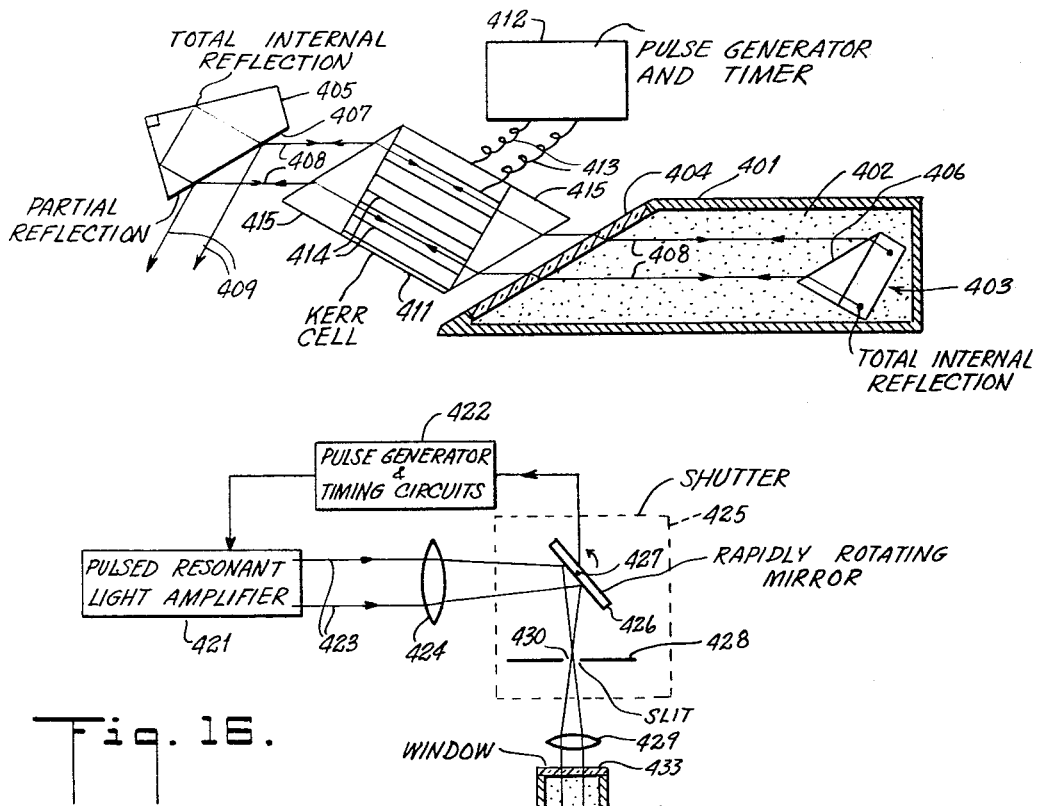

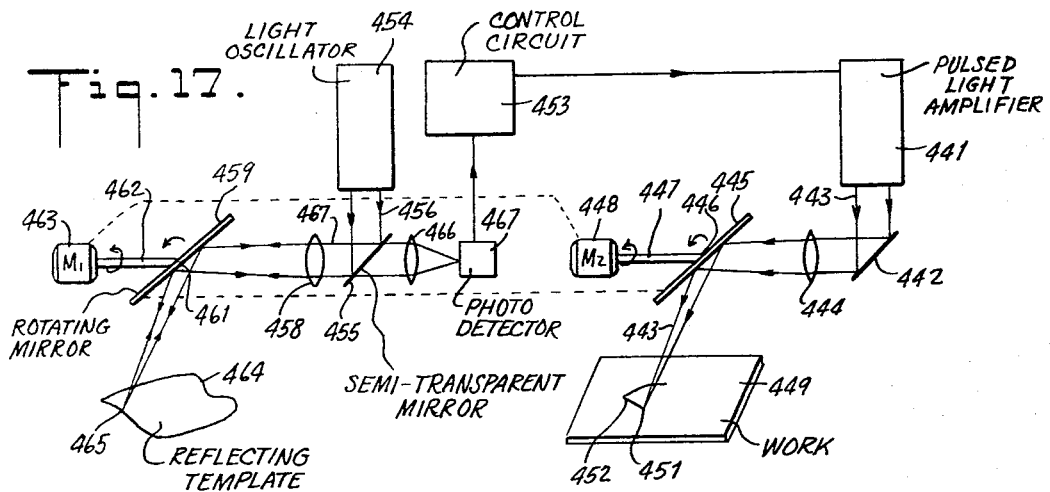
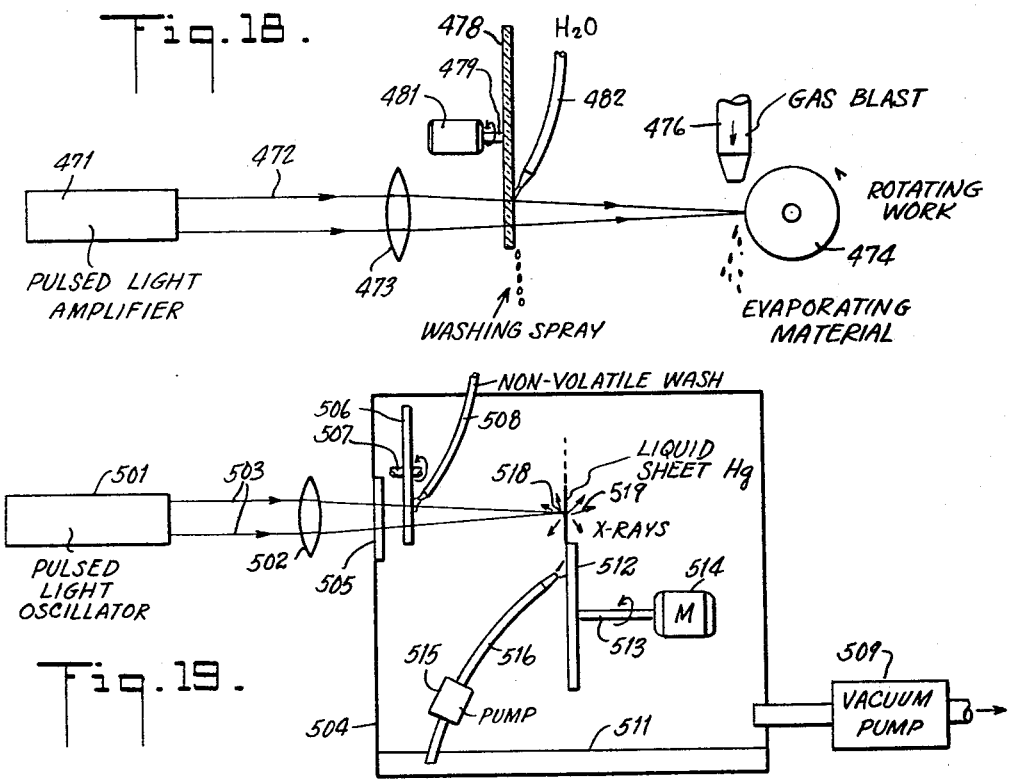

United States Patent Office 3,388,314
Patented June 11, 1968

3,388,314
APPARATUS FOR GENERATING RADIATION OF FREQUENCIES HIGHER THAN THOSE OF LIGHT
Gordon Gould, New York, N.Y., assignor, by mesne assignments, to Control Data Corporation, South Minneapolis, Minn., a corporation of Minnesota
Original application Apr. 6, 1959, Ser. No. 804,540. Divided and this application Aug. 21, 1967, Ser. No. 665,667
3 Claims. (Cl. 321—69)

ABSTRACT OF THE DISCLOSURE

Apparatus of various types is disclosed for the amplification and generation of light by the stimulated emission of photons from ions, atoms and molecules in the gaseous liquid and solid state with the amplified light being characterized by spatial or time coherence, including types of apparatus in which the ions, atoms or molecules are excited by light or by an electronic discharge and types of apparatus in which the stimulated emission of photons is accomplished in a resonator consisting of a pair of opposed specular reflectors or other environment where the light energy is caused to build up in intensity; and systems incorporating such light amplifying or generating apparatus, including systems for the generation of intense heat and high temperature reactions in solids, liquids and gases, communications systems and distance and time measuring systems.

---

This application is a division of application Ser. No. 804,540, filed Apr. 6, 1959.

The present invention relates to light amplifying devices operating on principles similar to those utilized in a maser (microwave amplification by stimulated emission of radiation) and to various systems incorporating such devices. More particularly, the invention relates to the amplification of light by the stimulated emission of photons from ions, atoms, or molecules in gaseous, liquid or solid state; in particular cases this is accomplished in a "Cavity" or other environment where the light energy will not be free to escape unimpeded, but may be caused to build up in intensity. The amplified light in such apparatus is characterized by spatial or time coherence.

A short explanation of the physical principles involved will be helpful in explaining the nature of the invention.

It is known that atoms, ions or molecules (hereinafter called molecules) ordinarily exist in so-called "stationary" states possessing a more or less well defined energy. While in such a state a molecule does not exhibit an oscillating electric or magnetic moment. However, since a molecule is made up of charged particles, it will be perturbed by any oscillating electric or magnetic field in which it may lie. When so perturbed, a molecule originally known to be definitely in stationary state "$a$" will possess a certain probability of being found in state "$b$" with different energy. When in such a "mixed" state, the molecule may exhibit an oscillating electric or magnetic moment (i.e., it may appear as a system of oscillating charges, or charges in changing orbits). A molecule will undergo a transition from state "$a$" to state "$b$" (i.e., have a large probability of being in state "$b$") if the induced electric or magnetic moment oscillates with almost the same frequency as the applied electric or magnetic field, and if the polarizations and phases of the oscillations correspond. The frequency of the oscillating moment is determined by the Einstein relationship:

$$\Delta E = h\nu_0$$

where:

$\nu_0$ = the oscillation frequency
$h$ = Planck's constant
$\Delta E$ = the energy difference between the two molecular states.

The same equation $E = h\nu$ gives the energy of the photons associated with the electro-magnetic field. The photon density is proportional to the energy density of the field. During a transition, a photon or "quantum" electromagnetic energy is emitted to or absorbed from the field, depending on whether the molecule is changing from a higher to lower energy state or vice-versa.

Even when there is no radiation energy density of the right frequency directly observable at the molecule, spontaneous transitions occur from higher to lower states with the emission of photons. These transitions are actually induced by random fluctuations in the electro-magnetic field of so-called "empty" space.

The photons emitted during an induced transition have the same phase and polarization as the inducing wave—i.e., they are "coherent" with it. A single atom may radiate a photon in any direction. However many atoms distributed over a finite volume and radiating coherently cooperate to generate a wave having the same propagation vector as the inducing wave, within the limits of a diffraction pattern. That is, they amplify the inducing wave. The radiation from induced emission has a spectral distribution similar to that of the inducing radiation and may be in a very "sharp" line.

Spontaneously emitted photons, because of the random nature of the zero-point fluctuations, have no definite phase or polarization. Because the zero-point fluctuations contain all frequencies, spontaneously emitted radiation has a finite bandwidth, characterized, at the least, by a Lorentzian line shape.

In thermal equilibrium, the populations of two states are related by the Boltzmann distribution factor:

$$\frac{N_{high}}{N_{low}} = e^{-\left[\frac{E_{high} - E_{low}}{KT}\right]}$$

Thus, in equilibrium the population of a higher energy state is less than that of a lower energy state. In particular, the population of a state separated from the lowest by an optical frequency is practically nil at ordinary temperatures. Induced transitions under these conditions necessarily absorb photons from the radiation field.

The foregoing principles can be utilized to devise apparatus for microwave amplification by stimulated emission of radiation which has been termed a maser. If by some means the population of a higher energy state is made larger than that of a lower energy state, induced transitions must necessarily result in the emission of photons to the radiation field. Thus a molecule may emit spontaneously a photon which in turn may induce coherent emissions in neighboring molecules, adding to the total radiation energy. If the transition is at a microwave frequency, the system may be enclosed in a cavity resonant at the same frequency and the escape of the photons prevented. If the power loss from the cavity is less than the power emitted from the molecules, the system will oscillate with a frequency which fluctuates much less than the (Lorentz) bandwidth of the transition. The condition for maser oscillation in a gas is that the excess population density $$(N_h - N_i) \geq \frac{h}{8\pi^2 p^2 \tau Q}$$

of the gas fills the cavity.

$\tau = T_1 = T_2$ is the relaxation time or state lifetime.
$Q$ = the "quality factor" of the cavity.
$p$ is the oscillating electric or magnetic moment characterizing the transition.

If the condition for oscillation is not quite met but external power is coupled into the cavity, the "sensitized" or "pumped" molecules will add to or amplify the signal. Because power is lost through the output coupling, the condition for infinite gain, at optimum output, is $$(N_\mathrm{h}-N_\mathrm{i}) \geqq \frac{h}{4\pi^2 p^2 \tau Q}$$

This amplification adds very little random "noise" to the amplified signal. The minimum noise is determined by thermal fluctuations in the radiation field or by random spontaneous emission, whichever is larger.

Several methods have been proposed for maintaining an excess population in the higher of two molecular energy states of a gas filling a resonant maser cavity. One form of maser which has been proposed achieves "optical pumping" by unpolarized light.

The discussion of this form of "optical pumping" will be given in terms of rubidium (atoms) but would be similar for other cases. Light, characteristic of various spontaneous transitions in Rb, is generated in a discharge lamp and passed through a filter. The filter removes all frequencies except that component line which induces transitions from the $F=1$ hyperfine level of the ground electronic level to some particular higher electronic level. Spontaneous decays back to both hyperfine ground levels will result in a net pumping of Rb atoms from $F=1$ to $F=2$.

To maintain an excess population in $F=2$ over $F=1$, the optical pumping rate need only exceed the collision relaxation rate which may be made as small as 10/sec. Of course this minimum pumping rate would give a correspondingly small power output from the maser.

In the light amplifier, on the other hand, the negligible thermal population of higher electronic states and the high rate of spontaneous emission from these states, make necessary a much higher pumping rate. In general, these effects preclude light amplifier operation between a higher state and a ground state. Usually, a transition between two higher electronic states must be utilized.

Like the maser, the light amplifier will operate on the principle of induced transitions from a higher energy state to a lower energy state with smaller population. However, the techniques usable and possible are appropriate to the optical region of the electro-magnetic spectrum. This frequency range is defined for the present purpose by the limit of transparency of materials in the infrared and ultraviolet to be approximately:

$$10^{-2} \text{ cm.} > \lambda > 10^{-5} \text{ cm.}$$
$$3 \times 10^{12} \text{ cycles/sec.} < \nu < 3 \times 10^{15} \text{ cycles/sec. in practice}$$

Another limitation which becomes serious in the far ultraviolet is the amount of power spontaneously emitted by the active atoms. This emitted power increases as $\nu^4$, and must be equaled or exceeded by the input power in order to have light amplification. At $\lambda=1000$ A. an input power of the order of 1 kilowatt is required. Below this wavelength the required input power is too large to dissipate.

Likewise, the useful properties of the light amplifier are qualitatively different from the maser and derive from the vastly shorter wavelength and higher frequency of the radiation involved.

The previous explanation has been given in terms of amplifiers and amplification, but it should be understood that if sufficient gain can be achieved, the light amplifying apparatus can be rendered self-oscillating. Thus a controlled light oscillator may be provided as well as an amplifier. The systems utilizing the apparatus as an oscillator will also be useful.

One form of the light amplifier which will be described as the non-resonant form may be utilized as an oscillator to generate light waves which fall within a narrow frequency bandwidth and have an exceedingly constant average frequency. Light from such an oscillator, particularly when short term frequency perturbations have been effectively eliminated by averaging over a finite period of time, provides a light frequency standard having an accuracy comparable to the accuracy of any known frequency standards. A light source of this type has obvious applications in the measurement of time, frequency, and particularly of distance by interferometric techniques.

Another form of light amplifier according to the present invention, which will be described as a resonant form, has somewhat different characteristics and is useful for different and quite varied applications. It is a characteristic of a resonant light amplifier constructed according to the present invention that its output is in the form of a beam which is very nearly a plane wave if the input is a plane wave. That is, the divergence of the beam may be very small so the energy of the beam is substantially contained within a very small solid angle of the order of $10^{-8}$ steradians or less.

Apparatus according to the present invention provides the capability of amplifying light coherently, at least with respect to frequency and phase and in some cases also with respect to direction of propagation, and axis of polarization. Insofar as is known no apparatus with this capability has heretofore been produced.

A coherent infrared light molecular amplifier and generator has been proposed in U.S. Patent No. 2,851,652 to Robert H. Dick. This apparatus and methods proposed by Dicke differ in many respects from those of the present invention. In the Dicke device ammonia molecules are provided in a bounded volume wherein the higher of two molecular energy states is more highly populated than the lower; this is accomplished by physically separating, by electric fields, the molecules in the lower state from a beam of molecules before the beam is permitted to enter the bounded volume. Such activated molecules are capable of amplifying an electro-magnetic wave within a particular frequency range.

The present invention, on the other hand, causes the atoms, ions or molecules of the working medium to be activated to produce the desired population excess in the higher energy level without actual physical separation. Furthermore, the desired population excess is produced within the bounded volume in which emission takes place in the present invention; whereas, in the Dicke apparatus the physical separation to produce the desired population distribution is accomplished outside the cavity after which the working medium is physically transported into the bounded volume in which stimulated emission takes place.

A simple very effective apparatus results from the different method and apparatus for activation utilized in the present invention.

Resonant oscillators according to the present invention have the characteristic of nearly plane wave output. Accordingly, a unique communication system can be provided by the present invention. The capabilities of such a system can be appreciated by the fact that the output light energy may be concentrated within a solid angle of the order of $10^{-8}$ steradians; this is well within the capabilities of such an oscillator. Such a beam need only be modulated with any information which it is desired to transmit, and detected at the receiving station at a distance (limited by line of sight considerations and atmospheric transmissibility) by conventional photoelectric or other suitable techniques and demodulated. Communication systems utilizing such apparatus would have advantages over virtually all known systems including microwave radio transmission systems and the like, from the point of view of efficiency and amount of information transmitted per channel.

A further system utilizing the principles of the invention makes use of the near planarity of the light wave from a resonant oscillator. When combined with a focusing means such as a parabolic mirror, the resonant oscillator provides a means for concentrating considerable energy in a volume much smaller than had heretofore been possible thus allowing the creation of very high temperatures within a very small volume. In addition to use for scientific research, such a heat source may be used in high temperature processes for industrial purposes and in other applications where exceedingly high temperatures are required.

Although various specific systems incorporating the light amplifier or oscillator have been mentioned above and will be described in more detail, there are numerous other applications of the light amplifying device such as projection TV, high speed photography, precision measurement of length and velocity, illumination, control systems for various kinds of equipment, generation of X-rays, etc. In addition to the above objects and advantages of the present invention, it is an object of the present invention to provide a light amplifier wherein light is amplified by raising atoms, ions or molecules to a particular energy level and stimulating them by exposure to light having a frequency corresponding to the energy difference between that level and a lower energy state of the atoms, ions and molecules thus stimulating the atoms, ions or molecules to decay to the lower energy state with the emission of light energy coherent with the stimulating light, thereby amplifying it.

It is another object of the present invention to provide such a light amplifier wherein a confined space is provided with reflecting walls causing emitted light to re-traverse said space repeatedly causing additional stimulation of atoms, ions or molecules within said space.

It is still another object of the present invention to provide such a light amplifier utilizing specular reflectors spaced so that the paths therebetween are of a definite distance representing a definite number of wavelengths of the amplified light whereby other wavelengths are discriminated against and whereby a nearly planar wave of light is generated.

It is still another object of the present invention to provide such a light amplifier wherein the conditions for oscillation may suddenly be changed, thereby causing the excited atoms, ions or molecules to emit photons in a short, transient wave-train or light pulse of greater peak power than may be generated in steady-state operation.

It is a further object of the present invention to provide such a light amplifier wherein the atoms, ions or molecules are raised by exposure to light from a gaseous discharge lamp to a particular desired energy level (from which stimulated decay is to be produced).

It is a still further object of the present invention to provide a light amplifier of the type described immediately above in which the gaseous discharge lamp is filled with an element different from that of the atoms, ions or molecules to be excited and which has an atomic resonance which by change coincides with a spectrum line of the atoms, ions or molecules to be excited.

It is a still further object of the present invention to provide such a light amplifier wherein the atoms, ions or molecules are raised to a particular desired energy level (from which stimulated decay to a lower level is to be produced) by supplying electrical energy to produce a discharge within the confined space in which the atoms, ions or molecules to be excited are contained.

It is a still further object of the present invention to provide such a light amplifier wherein the atoms, ions or molecules are raised to a particular desired energy level (from which stimulated decay to a lower level is to be produced) by utilizing collisions of the second kind with atoms, ions or molecules of a different element or elements from that to be stimulated to produce the emission of light.

It is a still further object of the present invention to provide a light amplifier having an optical system with reflecting elements having surfaces subtending predetermined angles by which light from a range of angles is accurately reflected back upon itself in a manner analogous to the operation of a microwave corner reflector.

It is an additional object of the present invention to provide such a light amplifier having an optical system consisting of filters and reflectors which will permit the generation light only within a predetermined frequency range and with a definite polarization.

Other objects and advantages will be apparent from a consideration of the following description in conjunction with the appended drawings, in which:

FIG. 4 is a partially schematic illustration of a resonant light amplifier excited by incoherent light radiation and utilizing triangular prisms as reflecting surfaces;

FIG. 5 is a partially schematic illustration in cross-section of an alternative optical system for the apparatus of FIG. 4, for example, in which only light polarized in the plane of the paper will be generated;

FIG. 6 is a partially schematic illustration in cross-section of a resonant light amplifier excited by incoherent light radiation and utilizing optically flat parallel mirrors for its reflecting surfaces;

FIG. 7 is a partially schematic illustration in cross-section of a resonant light amplifier designed to be excited by a discharge within the resonant cavity;

FIG. 8 is a diagram of the energy levels of the iodine molecule useful in explaining a form of the invention utilizing coincidence of spectral lines in energizing a working medium in a light amplifier;

FIG. 11 is a schematic diagram of a high temperature heating apparatus utilizing a resonant light oscillator according the present invention;

FIG. 12 is a schematic diagram of a frequency standard employing nonresonant light oscillators according to the present invention;

FIG. 13 is a schematic diagram of interferometric apparatus comprising a nonresonant light oscillator according to the present invention;

FIG. 14 is a diagram of some energy levels of zinc useful in describing a form of the invention utilizing an internal discharge for exciting the working medium;

FIG. 15 is a partially schematic illustration in cross-section of a form of resonant light amplifier wherein the light path traverses a Kerr cell by means of which the losses of the system may be rapidly varied in order to generate a transient light pulse.

FIG. 16 is a partially schematic diagram of a system for generating short light pulses comprising a pulsed resonant light amplifier of the type shown in FIG. 15, for example, a rapid shutter for "trimming" the ends of the transient wave-train, and a nonresonant light amplifying tube which further shortens and "peaks" the pulse;

FIG. 17 is a partially schematic diagram of a system wheerin the light beam from a resonant light amplifier is manipulated by mirrors to scan an object and by detection of the reflection therefrom to provide information for the automatic control of equipment which may comprise a pulsed light amplifier and moving mirrors;

FIG. 18 is a partially schematic diagram of an evaporative machining apparatus utilizing a light oscillator according to the present invention; and FIG. 19 is a partially schematic diagram of apparatus for subjecting a liquid to a very high temperature and utilizing a light oscillator according to the present invention.

Nonresonant light amplifier

Figure 1:
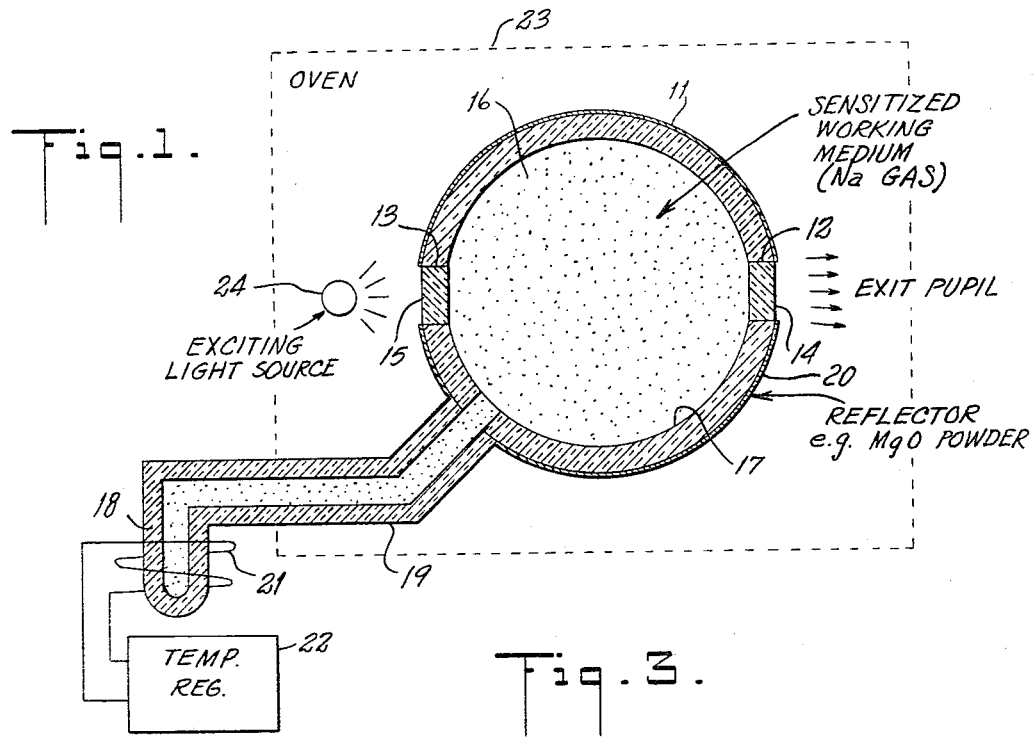
FIG. 1 is a partially schematic illustration in cross-section of a nonresonant light amplifier designed to be excited by an external source of light radiation.

Referring to FIG. 1, there is shown at 11 a spherical cavity 11 forming a principal part of a nonresonant light amplifier. Although a spherical cavity has an optimum volume to surface ratio, the cavity need not be of this shape but could be cylindrical, rectilinear, or of other shape if desired.

The cavity 11 is provided with apertures 12 and 13 for the output and the exciting light input respectively for the cavity. Suitable windows 14 and 15 are provided to cover the apertures 12 and 13 and should be made of a material such as glass or the like, having a high transmission coefficient for the frequency of light involved.

The interior 16 of the cavity 11 is filled with a sensitized working medium in this form of the invention, the nature and function of which will be hereinafter explained in more detail.

The wall 17 of the cavity 11 is rendered reflective as by a reflective coating 20. This surface may either be a specular reflector such as polished metal, or a diffuse reflector. For light in the visible region the highest reflectivity is achieved with a diffuse reflector such as magnesium oxide powder, and such a reflective surface would generally be preferred for the reflecting coating 20.

A gaseous atmosphere for the cavity interior 16 is supplied from a reservoir 18 connected to the cavity by a conduit 19.

A heating coil 21 controlled by a temperature regulator 22 may be utilized to maintain the vapor in the interior of the cavity at the desired pressure. A temperature control oven 23 is provided surrounding the cavity 11 to mantain the cavity at a temperature higher than that of the reservoir 18 thus preventing condensation in the cavity 11 and assuring control of pressure by means of a temperature regulator 22 regardless of changes in ambient temperature of the cavity.

Light is directed from an exciting light source 24 through the window 15 to the interior of the cavity 11. In a typical case, the light source 24 will comprise a gas discharge lamp having a gaseous atmosphere similar in composition to that of the atmosphere in the interior 16 of the cavity 11.

Although solid or liquid fluorescent material may be advantageous in certain applications rather than a gaseous medium within the cavity 11 in FIG. 1, transition processes in gases are more completely understood and accordingly the explanation will be primarily directed to this more readily understood form.

Operation of nonresonant light amplifier

The operation of the light amplifier of FIG. 1 will first be explained with reference to a relatively simple form of excitation, that is, excitation by resonance radiation. It should be understood that other forms of excitation which will later be explained may in many cases be preferable to the simpler type of excitation by resonance radiation.

A desirable medium for this form of excitation is sodium vapor and for the purpose of this explanation, it will be assumed that the interior 16 of the cavity is filled with sodium vapor and that the exciting light source 24 is a sodium vapor lamp.

Figure 2:
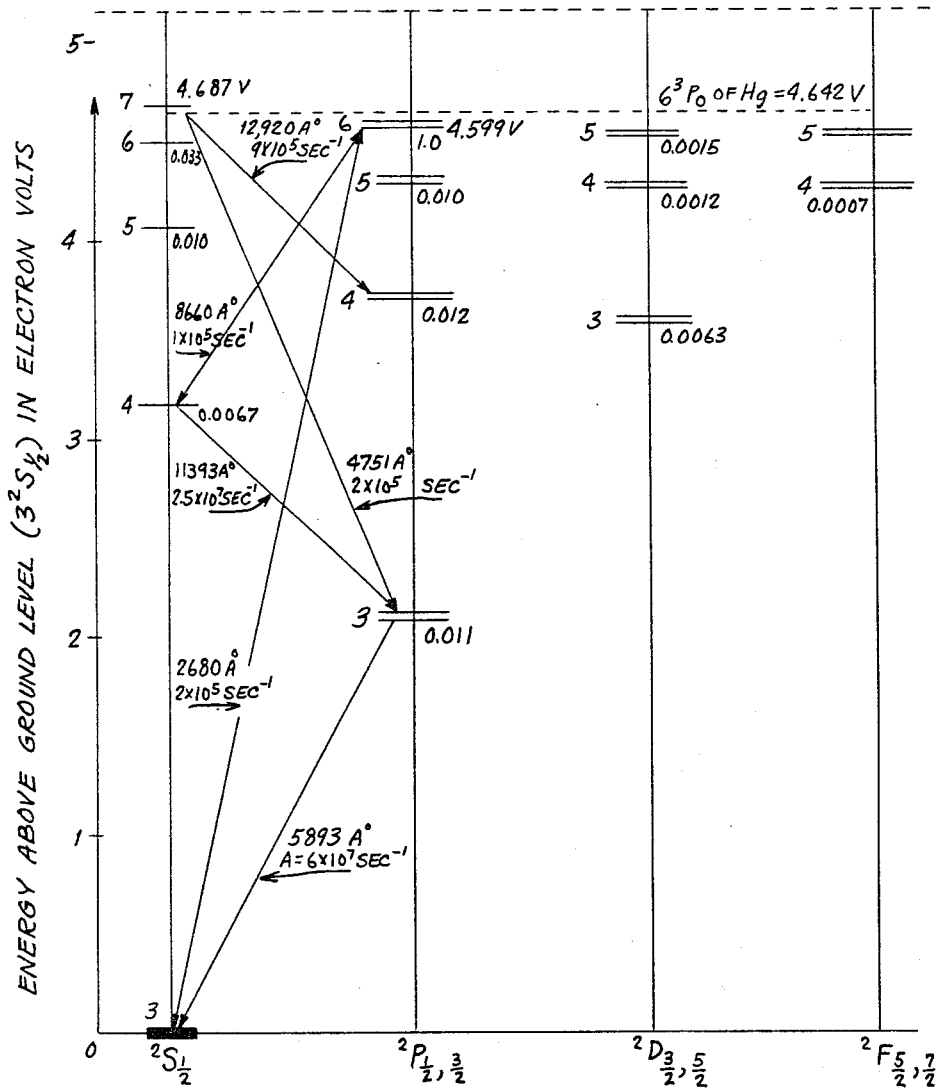
FIG. 2 is a Grotrian diagram of energy levels of sodium presented to aid in the explanation of light amplifying apparatus according to the present invention.

FIG. 2 is a diagram of some of the higher electronic levels of sodium. The hyperfine structures of these electronic levels are not shown.

The free-space wavelengths (in Angstroms) of the electro-magnetic radiation emitted during transitions between certain pairs of levels are given on the diagram of FIG. 2. The measured or estimated spontaneous emission rates for these transistions are also indicated. Electric dipole radiation selection rules permit transistions only between levels in adjacent columns of the diagram. Thus no transitions occur between levels with the same letter designation (same orbital angular momentum). Atoms in the ground level ($3^2S_{1/2}$) can be excited by resonance radiation from a sodium lamp only to the various P-levels. However, all states may be excited by collisions with energetic electrons in a discharge or by collisions with other excited atoms (collisions of the second kind).

It is desired to achieve a higher population in some higher level than in a lower level, to which transitions may be induced by the presence of light energy of suitable frequency. If it is assumed that only the $6^2P$ levels are excited directly from the ground level, light exciting other levels could be removed by an appropriate optical filter. Then by spontaneous emission various lower levels will become populated to some extent. The populations in dynamic equilibrium may be calculated from the spontaneous decay rates.

If the $6^2P$ levels are assumed to have a unit population, the computed populations of the other lower levels are shown in the diagram. It may be noted that the population of the $4^2S_{1/2}$ level is only 0.0067 of the $6^2P$ levels population and hence transistions generating the 8660 A. infrared line may be expected in a suitable enclosure.

From the diagram of FIG. 2 and the foregoing explanation, it will be seen that when the medium in the cavity 11 is excited by the light from the light source 24, a condition is produced where the population of a higher energy level ($6^2P$) is much higher than the population of a lower energy level ($4^2S_{1/2}$) so that the presence of light of the frequency represented by the difference between these two energy levels (wavelength 8660 Angstroms) will stimulate decay from the higher energy level to the lower energy level with the emission of more light of this same frequency.

Accordingly, when the pumping rate due to excitation from the source 24 is sufficiently great to maintain a large population difference between these two levels in favor of the higher level, and when losses in the cavity are reduced to a sufficiently low level as by maximizing the reflectivity of the surface 20, conditions for sustained oscillation will be met and the apparatus of FIG. 1 will operate as a nonresonant light oscillator.

Obviously, if the conditions for oscillations are approached but are not met, light of the appropriate frequency (8660 Angstroms) introduced into the cavity will be amplified by the stimulated emission of radiations and the output of the cavity at that frequency will be greater than the input thus providing amplification, but self-sustained oscillation will not occur.

The nonresonant light amplifier of FIG. 1 is schematically shown with a relatively small window for the introduction of light excitation; in practice, it will generally be desirable to utilize a substantial portion of the surface of the cavity as a window for light excitation. It will be recognized that increasing window area cuts down on the available surface for reflection. The effective reflection coefficient may be kept relatively high by arranging the reflective portions of the cavity on opposite portions of the surface of the amplifier enclosure.

If the window area desired for light excitation is a substantial portion of the total area of the cavity, it may be preferred to make the amplifier in another form, such as cylindrical, for example. This form may be particularly desirable as the curved peripheral surface of the cylinder may be made transparent for the introduction of light excitation while the ends of the cylinder may be rendered diffusely reflective. With this arrangement a large amount of light power may conveniently be transmitted into the cavity. Although there may be some reduction of average effective reflection coefficient, this is offset by other considerations.

If the cylindrical nonresonant amplifier described above is made in elongated form, only light within a narrow angular range of direction of propagation will be amplified and thus the noise due to spontaneous emission will be reduced, yielding a narrower output bandwidth. The output of an elongated cylindrical nonresonant amplifier may largely be restricted to an angle on the order of approximately 6°; this is much more convenient and may be directed more efficiently than the diffuse output as from a spherical amplifier or oscillator.

Tendency toward resonance in the elongated cylindrical nonresonant light amplifier will be avoided by the fact that light paths of many different lengths will exist between the reflectors; if desired, the reflectors may be shaped to increase the diversity of optical path lengths between reflectors.

Various elements other than sodium may be utilized in the construction of such a nonresonant amplifier, particularly those elements in group 1 of group 3. The characteristics of sodium, however, are generally more favorable than those of other elements.

A slightly more complex mode of operation has definite advantages over the relatively simple resonance radiation excitation described above. This mode of operation utilizes enhancement of intensity by collisions of the second kind to enhance the intensity of a particular spectral line from the lamp.

Considerable study has been made of the phenomenon of "sensitized fluorescence." Atoms of one kind, excited to a particular electronic level, may, on collision with atoms of a second kind, transfer their excitation energy. It has been shown experimentally and theoretically that the transfer process is most probable if two conditions are fulfilled:

(a) The smaller the energy difference between the levels of interest in the two kinds of atoms, the greater is the collision cross-section for the exchange.

(b) The total electronic angular momentum of the two atoms remains the same before and after the collision (Wigner partial selection rule).

In connection with rule (a), the energy difference must be converted to or from kinetic energy of the atoms. If the energy difference is less than "thermal energy" ($<KT\approx 0.03$ ev.) and if rule (b) is obeyed, the cross-section may be more than 100 times the "kinetic theory" cross-section. In particular, collisions of the second kind have been observed between metastable Hg ($6^3P_0$) atoms and sodium atoms in a mixed gas. It will be observed from the diagram of FIG. 2 that the Hg ($6^3P_0$) level falls between the Na (7S) and Na (6P) levels and is $<0.045$ ev. from either. It has been observed that the visible Na (7S→3P) 4751 A. line became as intense as the Na (3P→3S) 5893 A. line under certain conditions, showing that the bulk of the energy was transferred to the Na (7S) level. The intensity enhancement will be about 20 times. It may be expected that transitions from the $6P_{1/2}$ level will be similarly enhanced.

The proper mixture of Hg in Na amalgam to obtain the necessary pressure of both Na ($\sim 10^{-4}$ mm. Hg) and Hg ($\sim 1.0$ mm. Hg) at operating temperature can be obtained from published data or approximately from Raoult's law.

From the foregoing explanation, it will be seen that by utilization of collisions of the second kind with a different kind of atom, the efficiency of the operation by which a greater population of a higher energy level is produced by optical-pumping may be substantially increased with a resulting increase in efficiency of operation of the light amplifying device.

Nonresonant light amplifier with internal discharge

Figure 3:
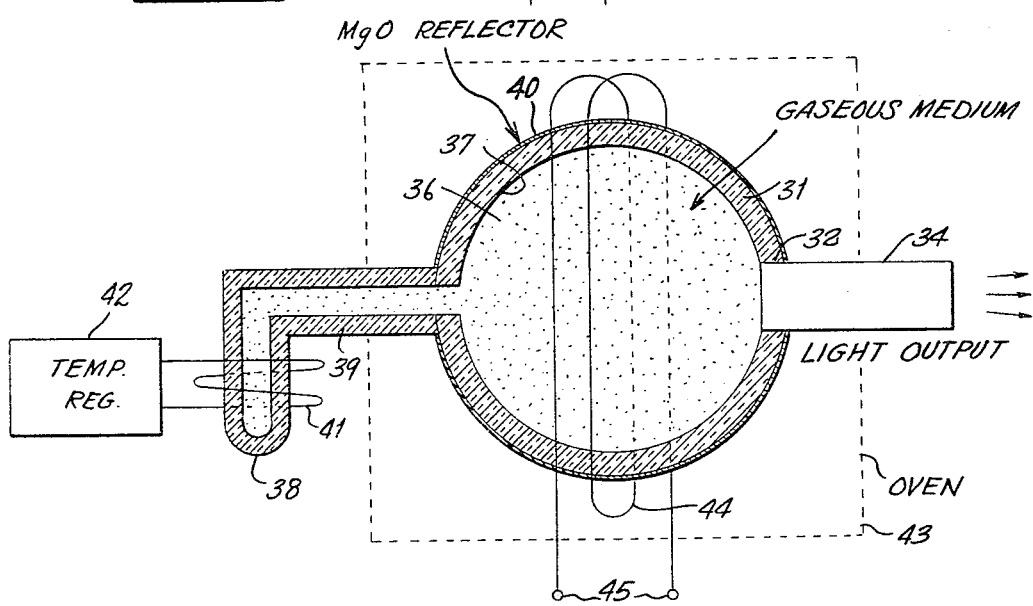
FIG. 3 is a partially schematic illustration in cross section of a nonresonant light amplifier designed to be excited by an electrical discharge within the amplifier cavity.

FIG. 3 shows a modification of the nonresonant light amplifier in which the gaseous medium within the cavity is excited directly by application of radio frequency energy rather than being excited by a light source as in FIG. 1 (low frequency energy or a direct current discharge could be used instead where desired).

A cavity 31 is provided having an opening 32 for the transfer of light output to the exterior of the cavity. A rod of transparent material shown at 34 may be utilized to transmit the light output from the apparatus, or alternatively, windows may be used as illustrated in FIG. 1.

The interior 36 of the cavity is preferably filled with a gaseous medium such as a mixture of mercury and sodium vapors as previously described. The wall 37 of cavity 31 is provided with a reflecting surface 40 such as magnesium oxide.

A reservoir 38 is connected by a conduit 39 to the interior 36 of the cavity 31 in order to provide a gaseous atmosphere of the desired composition and pressure within the cavity 31. A heater 41 is provided for the reservoir 38 and is controlled by a temperature regulator 42 thus providing control of the pressure of the vapors within the cavity. Excessive fluctuation of pressure within the cavity 31 and condensation within the cavity 31 is prevented by maintaining the cavity 31 in a temperature controlled oven 43.

Energy is supplied to excite the atoms within the cavity 31 by a coil 44 surrounding the cavity and supplied with high frequency excitation which may be of a frequency of approximately 100 megacycles for example.

Thus in the device of FIG. 3 excitation of atoms within cavity 31 is by a radio frequency energy induced discharge rather than by light excitation as in the apparatus of FIG. 1. In other respects the operation of the apparatus of FIG. 3 is substantially similar to that of FIG. 1.

Obviously the discharge within the cavity 31 may be produced in other manners such as by a direct current or low frequency discharge between electrodes within the cavity or by capacitively coupling high frequency electrical energy into the cavity rather than using the inductive coupling illustrated in FIG. 3.

The advantage of producing a discharge within the cavity rather than depending upon absorption of energy from a light source is readily understandable when it is realized that only approximately 20% or less of the light energy directed into the cavity is absorbed to produce useful pumping action. Furthermore, only a limited amount of "pumping" light can be introduced through a small hole. As the hole is made larger, the loss of light from the cavity becomes substantial. Where the discharge is produced within the cavity to excite the atoms, substantially all of the energy introduced into the cavity is absorbed in the working medium and a large fraction converted to useful output. If an internal discharge is used to excite the atoms, a large amount of "pumping" power may be coupled into the cavity.

The usefulness of the nonresonant light amplifier is somewhat limited by the large amount of noise present in the output signal. Random fluctuations in frequency or phase of the signal are generated by spontaneous transitions. In particular the usefulness of the nonresonant apparatus as an amplifier (as contrasted with an oscillator) is limited by this background of random spontaneous emission giving rise to a noise bandwidth of approximately 1000 megacycles (the Doppler width of the spectral line). The approximate equivalent noise temperature of the non-resonant light amplifier at the center of the visible spectrum is 30,000° K.

On the other hand, the nonresonant light amplifier, operating as an oscillator, emits an optical line up to 50 times narrower and 3,000 times as intense as the weak spontaneous emission background on which it is superimposed.

Furthermore, the nonresonant light amplifier, in spite of short term fluctuations in frequency, has a long term average frequency which is very constant. Thus by averaging the frequency over a finite period of time a light frequency standard may be obtained having a degree of accuracy comparable with that of any known frequency standard. Such a standard is useful not only in the measurement of time but also in the measurement of distance by interferometric techniques as will be understood by the description of systems for these purposes described hereinafter.

Resonant light amplifier

The previously described light amplifier(s) of FIGS. 1 and 3 are termed a nonresonant light amplifier(s) because the frequency of the light output, while relatively constant, is not to any substantial extent dependent upon the dimensions of the cavity within which the oscillation is generated.

An alternative form of the light amplifier will now be described in which the "resonant" frequency of the device is highly dependent upon the dimensions of the cavity. The resonant light amplifier also differs in other important respects, but the resonant characteristic of the device is utilized as a convenient way of distinguishing it from the previously described nonresonant light amplifier.

In FIG. 4 there is shown an elongated cavity 51 enclosed at the ends by end portions 52 and 53. As was the case with the nonresonant apparatus, a reservoir 54 is provided for supplying a gaseous atmosphere to the interior of the cavity. A heater 55 illustrated as a heating coil is controlled by a temperature regulator 56 to insure control of the pressure within the cavity 51.

As in the case of the light amplifiers of FIGS. 1 and 3, an oven 57 may be provided to enclose a portion of the apparatus to maintain it at a temperature higher than that of the reservoir 54 thus preventing condensation within the cavity 51 and allowing closer control of the pressure of a gaseous atmosphere.

From the foregoing explanation, it will be seen that the interior 58 of the cavity 51 is, in this form of the invention, supplied with a gaseous medium, the pressure of which can be controlled by means of the temperature regulator 56. The gaseous medium within the cavity 51 in FIG. 4 will be considered to be sodium, although as previously explained, other mediums may be used.

Excitation for the medium within the cavity 51 is provided by a cylindrical gas discharge lamp 59 surrounding the cavity 51. The gas discharge lamp 59 is preferably a sodium vapor lamp filled with a suitable gas or a combination of gases such as sodium and argon.

The outer wall 61 of the lamp 59 may be provided with a reflecting surface such as magnesium oxide to conserve light, whereas the inner wall 62 of the lamp 59 is preferably highly transparent to the desired spectral components of the light produced by the lamp.

The wall of the cavity 51 is also preferably highly transparent to this light. It is obvious that if desired a single wall may be provided between the interior 60 of the lamp 59 and the interior 58 of the cavity 51, thus making these two portions of the device as one integral element. The wall 62 may be formed of a material acting as an optical filter, if desired, thus discriminating against certain components of the light from lamp 59 which are not desired. The lamp 59 may also be provided with a reservoir 63, a heater 64 and a temperature regulator 65 in a manner similar to that provided for the cavity 51 so that the pressure within the discharge lamp may be independently controlled by means of the temperature regulator 65. It will be noted that the oven 57 also maintains the interior of the discharge lamp 59 at a higher temperature than that of the reservoir 63.

Electrodes 66 are provided in the lamp 59 and are supplied by power from a supply 67 through leads 68. The nature of the electrical excitation of the lamp 59 may be selected for the best results in a particular application and may be, for example, direct current, alternating current, or high frequency radio frequency excitation, etc.

It has previously been noted that it is desirable to provide means to confine and retain the light energy within the cavity in order that a number of emissions of light energy will be stimulated and the intensity of the light will be built up providing amplification in a manner somewhat analogous to that which occurs in an electron multiplier tube through avalanche effect.

The apparatus of FIG. 4 differs from the previously described nonresonant light amplifiers of FIGS. 1 and 3 in that the reflectors are specular reflectors rather than diffuse reflectors as used in the nonresonant cavity.

The reflectors in the cavity 51 comprise prisms 69 and 71. Mirrors may be used as reflectors in the cavity 51 but in many instances prisms are preferable due to the requirement for an extraordinary high degree of planarity and parallelism when plane mirrors are used and which requirement is significantly reduced by the use of prisms.

Thus the use of prisms is a feature of the invention of great practical importance. Prisms 69 and 71 are illustrated as triangular right-angled prisms. That is, the faces 73 of prism 71 are at right angles to each other as are the faces 72 of prism 69 (one of the faces 72 is not visible due to the orientation of a prism 69). Such 90° prisms can be ground with a high degree of accuracy. Assuming that the prisms are so ground, it is known that light rays entering the faces 75 or 74 of the prisms 71 and 69, respectively, are returned almost exactly in the direction from which they originated for a substantial range of angles of incidence with the front face (75 of the prism 71, for example). Furthermore, the effective pathlength for rays entering the face 75 is substantially the same over the surface of the face even though the angle at which the rays strike the face 75 is not exactly 90°.

The prisms 69 and 71 are preferably oriented so that their rear (roof) edges joining the diagonal faces are at 90°. That is, in FIG. 4 the edges joining the reflecting faces of the prism 69 are vertical while the edges joining the reflecting faces of prism 71 are horizontal.

Accordingly, with face 75 nearly perpendicular to the direction of impinging light rays, the prism 71 may be rotated several degrees about a horizontal axis extending into the paper without causing an appreciable change in the direction of reflection. The prism 69 can be rotated several degrees about a vertical axis without causing an appreciable change in the direction of the reflected rays. As a result, the placement of the two prisms 69 and 71 is not critical with respect to rotation about either of the orthogonal axes parallel to the rear edges of the prisms. As a result, the prisms 69 and 71 once ground to the tolerance required as regards the planarity and angular relationship of the various faces can be placed within the cavity 51 without any highly critical requirements of parallelism as regards the faces 74 and 75.

There are several alternative ways to reduce the criticality of the angular positioning of the reflectors. For example, one may replace the prism 71 with a corner reflector with three mutually perpendicular planar surfaces (which may also be a prism) and replace the prism 69 with a plane mirror. The mirror may be a "low loss" multilayer reflector which selectively reflects only light of the desired wavelength.

The advantage of utilizing prisms rather than mirrors may be appreciated by consideration of the general mode of operation of the resonant light amplifier. It is desired that the light rays traverse the distance back and forth between the reflecting beams a considerable number of times. If the optical pathlength over each circuit of the two reflecting means, and in fact, if the path circuit over a plurality of circuits of the reflecting means is not the same for each and every portion of the reflecting surface within the accuracy of a fraction of the wavelength, interference will be produced and a resonant nature of the system will be diminished or destroyed.

It is likely that one limit of the efficiency of the system will be the tolerances to which flat optical surfaces may be produced. It may be impossible to obtain a surface with a closer tolerance of flatness than approximately one-fiftieth of a wavelength as a practical matter. This, of course, will limit the efficiency of resonant light amplifiers utilizing prisms as well as the resonant light amplifier utilizing flat mirrors. In the case of the mirrors, however, it would also be necessary to place and retain the mirrors in respective ends of the cavity (which may be separated in a typical case by 30 centimeters) in parallel relationship with a tolerance of one-fiftieth of a wavelength, approximately. This can likely be achieved although it would necessarily involve a phenomenal degree of precision and expensive techniques that would go with such a precise operation. Furthermore, the completed device would be highly sensitive to disturbances and vibration of all types including physical accelerations, changes in temperature, etc.

The prisms 69 and 71 are preferably provided with non-reflective coating on their front faces 74 and 75, as light reflected from these faces will generally be lost due to being out of phase or slightly misdirected and will not add coherently to the main standing wave in the cavity.

The faces 73 of the prism 71 would normally be substantially 100% reflective. An output from the cavity (or in the case of an amplifier operation, an input as well) may be provided through one or both of the faces 72 of the prism 69. The face 72 may be rendered partially transmissive by placing on or near the face a material which has an index of refraction which does not differ from the index of refraction of the prism sufficiently to provide total internal reflection. By this means, any desired portion of the light impinging on one or both faces 72 may be transmitted to the outside of the cavity. Conversely, if the apparatus is to be used as an amplifier, thus necessitating an input, the same path or a similar path may be used for the input to the light amplifier.

In the case of an amplification operation as contrasted to an oscillator operation, there will generally be a loss of energy involved in transmitting the input signal into the cavity and transmitting the output signal out of the cavity. Obviously any normal type of transmission path for light energy into the cavity will also provide a path for the same kind of light energy out of the cavity. One may expect a loss on the order of 50% in this operation, but this will not be serious in view of the overall gain produced by the light amplifier. Such a problem need not arise in the case of a light oscillator as no input signal is required due to the fact that oscillations are built up from ever-present random fluctuations as is the case with other types of oscillator devices.

Operation of resonant light amplifier

As previously explained, the induced emission from atoms is coherent with the inducing radiation. That is, it has the same phase, frequency and polarization. If many atoms over the breadth of the inducing wave are emitting, the emitted radiation will also be a substantially plane wave with the same propagation vector except for small diffraction effects. With this understanding it will be seen that the resonant light amplifier of FIG. 4, although it has only small reflecting surfaces compared with its total cavity internal area, effectively confines the amplifying operation due to the fact that only light energy within a very narrow range of frequency and propagation direction is amplified and this energy has a direction of propagation vector such that it is substantially contained between the two reflecting surfaces.

There will be slight losses of energy off the edge of the reflectors due to slight discrepancies in the angle of propagation of the rays being amplified. This slight energy loss will not be sufficient in a well designed apparatus to prevent proper operation of the device.

Within its frequency an angular limits, determined by the dimensions and loss coefficient on reflection, the resonant light amplifier will amplify plane waves continuously variable in direction and frequency.

If the input wave is plane, the output wave is almost but not exactly plane. The finite size of a wavelength, $\lambda$, allows the wave front to spread as it travels. At great distances from a circular end-plate, the wave front, instead of remaining a circle of constant diameter, exhibits the Fraunhofer diffraction pattern of intensities. In this pattern approximately 98% of the light falls in a central spot of angular radius $$\Delta\theta = 1.220 \frac{\lambda}{2R}$$

more than half the light falls in a cone of half this angular radius. If the wave is focused on a nearby plane, one observes the same pattern instead of a point. The Rayleigh criterion for angular resolution of two plane waves focused in a telescope is that the waves shall make an angle with each other equal to $\Delta\theta$. That is, the maximum of one falls on the first dark ring of the other pattern. Thus plane waves from different points of a distant object could be amplified coherently by the resonant light amplifier and then focused on a screen or the face of a television camera tube. The resulting image could be scanned or otherwise used.

If a plane wave passes through a circular aperture, then at nearby distances the wave starts to spread and forms the Fresnel diffraction pattern.

Thus as a "plane" wave reflects back and forth inside the tube, light dribbles out of the cylindrical space between the reflectors. The fraction of light lost by this mechanism in travelling a distance $l = L/a$ is very approximately given by $$\phi_{\text{Diff.}} = \text{fract. lost} \approx \frac{1}{2R}\sqrt{\frac{L}{2a}}$$

where $L/a$ is the mean distance travelled by a photon before it is lost at a reflector.

If $\phi \to 1$ then the effective loss on reflection, $a$, will be appreciably increased. This puts a lower limit on the radius of the reflector. If $L = 100$ cm.
$\lambda = 5 \times 10^{-5}$ cm.
$a = .05$
$2R = 1$ cm.

then $\phi$Diff. $\approx 0.3$ which is about as high as desirable.

Amplifier with brewster angle prisms

Another form of resonant light amplifier is shown in FIG. 5, comprising a cavity 81 filled with a working medium 82, of any of the types described herein.

A prism 83 is provided in the cavity 81. This prism comprises two portions, 83a and 83b.

The portion 83a of prism 83 is a 90° triangular prism, the triangular faces of which are not visible in FIG. 5. One reflecting face 84 of the prism 83 is shown in FIG. 5; the other reflecting face is on the reverse side of the prism and is not visible. The edge of the front face 85a of the prism 83 is also shown in FIG. 5.

In practice, it may be desirable to form the prism 83 from one solid piece of transparent material in which case there will be no actual face 85a as indicated. However, the overall effect will be the same.

A second portion 83b of the prism 83 is also formed in the shape of a triangular prism; in this case a triangular face is visible in FIG. 5. Although the portion 83b of the prism 83 is shown as a right triangular prism in FIG. 5, there is no necessity for the right angle corner of the prism to be accurately formed, and in fact this angle need not be a right angle.

The front face 85b of the prism 83 is disposed at an angle to the longitudinal axis of the cavity 81 which is approximately equal to the cavity 81 which is approximately equal to the Brewster's angle for the prism 83. The Brewster's angle is that angle at which a wave polarized parallel to the plane of incidence is wholly transmitted (with no reflection) and a wave polarized at right angles to the plane of incidence is substantially totally reflected.

The prism 83 is preferably shaped so that rays incident upon the face 85b at the Brewster's angle (indicated by the angle $\theta_b$ in FIG. 5) are refracted to be approximately perpendicular to the face 85a of prism 83a (or in the event that portions 83a and 83b are formed from a single unitary piece of transparent material, then the plane separating these portions).

A second prism 86 is located at the other end of the cavity 81. The prism 86 is a right triangular prism oriented so that one triangular face is visible in FIG. 5. The edges of three rectangular faces of the prism 86 are visible in FIG. 5, namely those of reflecting faces 87a and 87b and of front face 88.

Front face 88 is also disposed at an angle with the longitudinal axis of the cavity 81 equal to Brewster's angle for the material of which prism 86 is formed. This angle is indicated by $\theta_b$.

Prism 86 is preferably cut so that rays incident upon face 88 at Brewster's angle are refracted to strike reflecting faces 87a and 87b at approximately an angle of 45°.

Due to the angle of incidence of the rays on the faces 85b and 88 of the prisms 83 and 86, respectively, in FIG. 5, the optical system of FIG. 5 functions not only to provide a closed path for light rays, but also to reject the light having other than a particular polarization. At the same time the problem of partial reflection of light from the front face of the prism is substantially eliminated by the orientation of these faces.

A window 89 is provided in the cavity 81 arranged to receive light reflected from the front face 88 of prism 86. From the previous explanation it will be understood that there would normally be no reflection of light generated in the cavity from the face 88, as there would be a closed path (and amplification) provided only for light of a particular polarization and this light would be totally transmitted through face 88. However, in order to provide an output from the cavity 81, the face 88 may be rendered partially reflecting by the addition of a coating, for example. An output may be provided also by setting the prism 86 at an angle differing somewhat from Brewster's angle and thereby causing a small amount of reflection of the polarized light generated within cavity 81. In some instances it may be desired to control the reflectivity from the face 88, which will, among other effects, control the output from the cavity 81; this may be accomplished by rotatably mounting the prism 86 so that the angle of incidence of rays with the front face 88 may be controlled by rotating the prism 86 about an axis perpendicular to the plane of the paper.

From the foregoing explanation it will be understood that FIG. 5 represents a preferred form of optical system which may be utilized in the light amplifying apparatus of FIG. 4 or others of the resonant light amplifiers, and which provides the advantage of substantially eliminating unwanted reflection from the front face of the prism, and at the same time provides a polarized output which is obtained by a filtering action inside the cavity 81. Such filtering action within the closed path inside the cavity is preferred to filtering the output from the light amplifier due to the fact that the approximately 50% power loss resulting from external polarization is substantially eliminated. The optical system of FIG. 5 also allows the reflectivity of the face 88 to be continuously controlled and thus allows controlling of the output from the light amplifier.

In addition to being useful in resonant light amplifiers, the optical system of FIG. 5 is useful in other applications where a light resonator is employed such as in a Fabry-Perot interferometer.

*Mirror type resonant light amplifier*

FIG. 6 shows an alternative form of resonant light amplifier device comprising a cavity 101 having transparent side walls and enclosed at its ends by flat mirrors 102 and 103.

The interior 104 of the cavity 101 is filled with a sensitized working medium such as sodium vapor. Placed around the cavity 101 is a concentric cylindrical discharge tube 105. The surface 106 may be provided with a reflective coating to conserve light while the inner wall 107 of the discharge tube 105 is transparent to the desired component of the light produced in the discharge tube.

Electrodes 108 are provided in the discharge tube 105 which are supplied with power from a power supply 109 through leads 111.

In the form of apparatus shown in FIG. 6 the medium in the gas discharge tube 105 is a mixture of sodium and mercury. As previously explained, such a mixture provides an enhancement of a desired spectral line by collisions of the second kind. This brings about a considerably increased intensity of the desired spectral line in the lamp and increases the optical pumping power which creates the desired population distribution in the energy levels of the atoms of sodium in the interior 104 in the cavity 101 conducive to stimulated emission of light radiation.

In FIG. 6 the reservoirs, ovens, and auxiliary equipment for maintaining the proper atmosphere in the discharge tube 105 and in the cavity 101 have been omitted for simplicity. Such elements may be provided for the apparatus of FIG. 6 in accordance with other figures of the drawings or any other suitable means for maintaining the appropriate atmosphere may be utilized.

The mirrors 102 and 103 may be metallized or multilayered interference reflectors. The latter are almost lossless (i.e., the transmission plus the reflection equals approximately 100%). Interference reflectors may have a very high reflectance, for a given wavelength, depending on the number of layers. A practical achievement is 98% in the visible for a 7-layer reflector. Flats with a closer tolerance than approximately $\frac{1}{50}\lambda$ are not currently available so if a resonant system is desired and more accurate flats are not available, higher reflectance would not be useful. An additional advantage of interference reflectors is that photons from other than the desired transition would not be reflected (due to frequency selectively), and hence, undesired stimulated transitions would be prevented.

It is clear from FIG. 6 that a plane wave travelling in a direction other than 90° to the mirror surface will "walk" off the edge and lose energy at a rate faster than the normal wave. The lateral displacement per reflection is $$x = L \sin \theta \approx L\theta$$

The fraction of wave energy which walks off at each reflection is roughly $$\frac{x}{2R} \approx \frac{L\theta}{2R}$$

So the effective loss coefficient on reflection is $$a = a_{abs.} + \frac{L\theta}{2R}$$

where $a_{abs.}$ is the loss at the reflector due to absorption and diffraction, or the rate of energy loss is $$-\frac{1}{E}\frac{dE}{dt} = \alpha = \frac{ac}{L} = \left[\frac{a_{abs.}}{L} + \frac{\theta}{2R}\right]c$$

As $\alpha$ increases, the gain of the light amplifier will decline proportionately in the range of linear amplification. A practical measure of the limiting angle at which effective amplification obtains might be that angle for which $\alpha = 2\alpha$ absorption:

$$\frac{\theta_2}{2R} = \frac{a_{abs.}}{L}$$

or $$\theta_2 = \frac{2aR}{L}$$

the maximum one might conceive would be $\theta_2 \sim 0.1$ radian, while for the dimensions immediately above, $$\theta_2 \approx 5 \times 10^{-4} \text{ radian}$$

The fact that the loss coefficient falls off with increasing angle, θ, determines a most important characteristic of the resonant light oscillator output, a very narrow beam.

It can be calculated that virtually the entire output beam will fall within the Farunhofer diffraction pattern for θ=0. It may also be shown that, with $P_{out}=1$ watt at $\lambda=1\mu$, the frequency bandwidth of the output beam will be less than 100 cycles/sec. This is residual bandwith due to the noise discussed below.

As pointed out previously, the random-fluctuation spontaneous emission background in the visible will correspond to transitions induced by thermal radiation at a temperature of 30,000° K. However, this is not so high as it first appears, since a resonant light amplifier may discriminate against all signals outside a narrow optical band and against all directions of propagation outside the central Fraunhofer lobe.

It can be estimated that the minimum equivalent noise input power in a Fraunhofer lobe is given by:

$$P_{min} \approx 1.5 \times 10^{-11} \text{ watts in the visible}$$

If the bandwidth, $\Delta_f$, is limited in a succeeding electronic amplifier, it can be shown that the following expression for this noise holds $$P_N = h\nu \left[ \frac{\pi}{2} \Delta \nu \Delta_f \right]^{1/2}$$

Thus the minimum noise depends on the square root of the bandwidth but not on the area of the reflectors 102, 103 at the tube ends.

The apparatus of FIG. 6 may be used as an amplifier as distinguished from a self-sustained oscillator by limiting the "gain"; that is, by limiting the amount of light power introduced from the discharge tube 105 so that a self-sustained oscillation is not produced. A signal may, therefore, be introduced through the mirror 103 as indicated by the arrow 112 as the mirrors 103 and 102 are partially transmitting.

The light ray indicated at 112 will cause stimulated emission of light energy within the cavity 101 which is coherent with the input signal with respect to phase, frequency and direction of propagation. The amplification within the cavity is rather selective with respect to direction of propagation and frequency so that only a relatively small range exists with respect to these two parameters within which an input wave will be amplified in the device.

The output from the light amplifier will be transmitted through mirrors 103 and 102 as indicated by the arrows 113 and 115. Either or both of these outputs may be utilized, depending upon the particular application or system in which the light amplifier is used.

As in the case of previously discussed light amplifier devices, the device of FIG. 6 may also be utilized as an oscillator simply by increasing the efficiency of the process or otherwise increasing the gain of the amplifier to the point where self-sustained oscillations are produced. In certain applications it may be desirable to utilize the same apparatus as both an oscillator and an amplifier, on a time sharing basis, for example. This may be accomplished, for example, by periodically increasing the light energy produced by the discharge tube 105 to momentarily produce self-sustained oscillations. It should be understood that the optical system can be replaced by other optical systems such as those illustrated in FIG. 4 and FIG. 5, and also that the exciting process utilized in FIG. 6 may be replaced by other exciting processes previously described.

It should be noted that the apparatus of FIG. 6 does not differ greatly from the nonresonant cylindrical amplifier previously described, and the resonant apparatus in FIG. 6 could be converted to a nonresonant amplifier by substitution of diffuse reflectors for the mirrors 102 and 103.

Resonant light amplifier with internal discharge

The technique of exciting the atoms within the cavity may be applied to resonant light amplifiers as illustrated in FIG. 7. An elongated cavity 121 is provided having enclosed ends 122 and 123. Desirably at least one of the ends such as 123 is transparent to light of the frequency for which the amplifier is designed. In the case of the cavity 121 the side walls need not be transparent as in previously described cavities because there is no necessity for introducing light energy through the walls, as different means of excitation are used.

The interior 124 of the cavity 121 is provided with a gaseous atmosphere which may be supplied from a reservoir 125 heated by a heating coil 126 controlled by a temperature regulator 127. As previously described in the explanation of other forms of the apparatus, the elements 125, 126 and 127 in conjunction with a temperature control oven 130 surrounding the cavity 121 assure that the pressure of the medium within the cavity is maintained at the proper value.

Preferably the interior 124 of the cavity 121 is filled with a gaseous atmosphere comprising a mixture of sodium and mercury, or with some other mixture of elements by means of which the efficiency of exciting the working atoms to a desired eenrgy level is enhanced by reason of collisions of the second kind. The general theory by which more desirable population distribution among the energy levels of one element is produced by collisions of the second kind with another element has previously been explained and will not be repeated here. The optical system of the device of FIG. 7 is similar to those previously described in that it comprises two prisms 131 and 134 having 90° angled faces 132 and 135, respectively, and front faces 133 and 136. As previously explained, the front faces 133 and 136 are preferably provided with a low-reflection coating so that substantially all of the reflection is by internal reflection from the faces 132 and 135.

At least one of the faces 135 may be provided with a coating of a medium having an index of refraction intermediate between that of the prism 134 and the atmosphere in which it resides thus preventing total reflection at the face 135 and allowing transmission of light generated within the cavity 121 through the prism 134. It may be noted at this point that light passing through the prism 134 may be divided into several beams by reflection and refraction. In some cases this may be desirable, but in the event that it is desired to direct substantially all of the output beam in one direction, additional prisms can be provided for combining the various output beams by reflection or refraction to be directed substantially in the same direction.

An optical filter 137 may be included in the light path between the prisms 131 and 134 for the purpose of discriminating against light of a frequency other than that selected for the operation of the light amplifier. Particularly when such amplifier is operated as an oscillator, there may be an atomic transition of higher probability than that generating the desired light frequency. Such a transition would generate an oscillation at a lower input power than required for the desired oscillation. Such parasitic oscillations must be suppressed. Generally, oscillation in several modes simultaneously will not occur, except as transients, and would in any case be undesirable. Accordingly, it may be desired to place an optical filter such as 137 within the cavity 121, thus reducing the gain for all except the desired frequency of light below the point required for sustained oscillation.

Another and different use for a filter (such as filter 137 within the cavity 121 as shown in FIG. 7) is for the purpose of providing a polarized light output from the light amplifier. Obviously the introduction of a polarizing filter within the closed path in the light amplifying device will introduce losses for light of all that the polarity for which the filter is transparent. These losses will greatly degenerate the amplification for other than the desired polarity of light and in an oscillator type device will prevent the generation of self-sustained oscillations except for light of the desired polarity.

The operation of a resonant light amplifier with a polarizing filter is therefore similar to that described for the apparatus of FIG. 5 which also includes polarizing means within the closed light path in the light amplifier. As in the case of the apparatus of FIG. 5, polarization within the light amplifier device has advantages over polarizing the light output from the device, in that loss of substantially half of the power, as would occur in polarization of the output, is substantially avoided. Furthermore, in some instances the light intensity may be sufficiently high in the output so that polarization of the light would present a heat dissipation problem. When the light is polarized within the light amplifier device, it is polarized before light of the unwanted polarization has a chance to build up in intensity and accordingly the heat or energy dissipation problem is substantially reduced.

It will be noted that in the apparatus of FIG. 7, no separate gas discharge lamp is provided for light excitation of the medium within a cavity. Instead a discharge is excited directly within the cavity 121 by means of electrodes 120 connected to a power supply 128 through leads 129.

Electrodes 120 in FIG. 7 are arranged inside the cavity 121 and may be energized to provide either a direct current or low frequency discharge. It is not necessary however, that the electrodes be within the cavity to produce a discharge within the cavity. For example, electrodes outside the cavity formed of aluminum foil or the like may be utilized to induce an R.F. electric discharge in the cavity 121.

As previously explained, producing the discharge within the cavity provides the immediate advantage of increased energy transfer into the medium within the cavity. Virtually complete transfer of energy into the medium can be accomplished by this means whereas excitation by a light source is limited to approximately 20% absorption of the light power introduced into the cavity. Other advantages of excitation by discharge within the cavity also arise.

The higher S-levels of sodium cannot be excited by resonance radiation since radiative transitions between states of the same orbital angular momentum are forbidden by the electric dipole selection rule. However, they can be excited by collisions of the second kind in a discharge within the cavity. In the case of excitation of Na ($7^2S_{1/2}$) by collisions with Hg ($6^3P_0$) metastables, the Wigner partial selection rule relating to collisions of the second kind is satisfied and the collision cross-country may be expected to be about equal to that for excitation to the $6^2P_{1/2}$ Na level. The enhancement of population should be at least 100 times that in a sodium-argon discharge. One may expect to exceed the condition for oscillation in this case by a factor of 20 (for a tube 1 cm. diameter and 100 cm. length).

It can be seen from the diagram in FIG. 2 that, in addition to light amplifier oscillation via the 12,920 A. ($7S \rightarrow 4P$) transition, there is the possibility of light amplifier oscillation in the visible 4751 A. ($7S \rightarrow 3P$) transition in sodium. Although the Einstein "B" coefficient is larger for the former than for the latter transition, the ($7S \rightarrow 3P$) or any other particular transition can be favored by inserting filters to absorb all other wavelengths or by using multiple layer reflectors (which reflect only a narrow band of wavelengths). Thus only for the selected transition will losses be small enough to permit the buildup of oscillation.

The pressure of sodium, and hence the operating temperature of the light amplifier tube, may be smaller since the density of Na atoms need only be large enough to ensure an adequate number of collisions/sec. with metastable Hg atoms ($p_{Na} \approx 10^{-4}$ mm. Hg) rather than enough to absorb the ($6P \leftarrow 3S$) resonance radiation.

This lower pressure can be arrived at as follows. It is known that under the usual conditions in a plasma the populations of metastable states are in thermal equilibrium at the electron temperature (of the order of 5000° C. for a Na-Hg discharge). Hence, the population of Hg ($6^3P_0$) metastables will be $\sim 10^{-4}$ of Hg ($6^1S_0$), the ground level, in a discharge of a few amperes. In a total pressure of 10 mm. Hg of Hg, the metastable partial pressure would be $10^{-3}$ of Hg or a density, $N \approx 10^{13}/cm.^3$.

The rate at which a sodium atom is excited to the 7S or 6P levels must correspond roughly with rates of quenching by collisions of the second kind in the case of $N_2$ and other such gases. For a partial pressure of Hg ($6^3P_0$), $P \approx 10^{-3}$ mm. Hg, this rate of Na excitation would be $\gamma Na \geq 10^5$ sec. For a sodium pressure, $P \approx 10^{-4}$ mm. Hg or $N_{Na} \approx 10^{12}/cm.^3$, the total excitation ratio $\approx 10^{17}/cm.^3$ sec. For a light amplifier tube of volume 100 cm.³, this gives $10^{19}$ excitations/sec., or about 30 times the calculated necessary rate. If this power is substantially used to generate coherent photons by light amplifier action, a beam power of $$P = h\nu \frac{dn}{dt} \cong 2 \text{ watts}$$

will be produced.

Conversely the rate at which Hg metastables are attacked by Na atoms will be $\sim 10^4$ sec for a metastable life-time $\tau \approx 10^{-4}$ sec. This is at least 100 times shorter than the diffusion time to the walls and hence there will be practically no useless loss of metastables via this mechanism. Thus the efficiency of conversion will be relatively high (of the order of 10 percent of input power). The discharge current must, of course, be sufficient to keep up the equilibrium population of metastables. A discharge power, $P = 3$ amps $\times 0.3$ volt/cm. $\times 100$ cm. $= 100$ watts should normally be adequate.

*Other atomic levels excitable in a discharge*

In addition to the excitation of the Na (6P and 7S) levels by collisions of the second kind with Hg ($6^3P_0$) metastables in a discharge within the light amplifier tube, a number of other energy levels are prospectively suitable for excitation in a discharge. These other levels could not normally be expected to be excited by radiation falling on the tube from outside, either because radiation-induced transitions from the ground level are forbidden,, or because the exciting radiation falls too far in the ultraviolet to pass through even the most transmissive medium such as a quartz tube wall.

A list of metastable levels which may be used to excite levels of nearly the same energy in other atoms by collisions of the second kind is given in Table I. These levels are long-lived because the electric dipole selection rules prohibit decay via this rapid radiative process to any lower level. Metastable levels are listed only for atoms which normally form a monotomic gas (uncombined in molecules) though others could possibly be utilized. Table I is not complete but contains levels most likely to be of practical use. The alkaline earth elements and Zn, Cd are not easily vaporized.

The processes listed below are not analyzed in great detail, but are listed as likely to be useful in particular cases or applications where particular frequencies or other characteristics are desired.

TABLE I

| Element | Metastable Levels | Energy Above Ground | Ionization Potential |
|---|---|---|---|
| Sn (v.) | | 2 | 7.3 |
| Pb | | 4 | 7.4 |
| Be, Mg, Ca, Sr, (Ba) | $n^3P_2, n^3P_0$ | | |
| Zn | $n^3P_2, n^3P_0$ | 4 | 9.39 |
| Cd | $n^3P_2, N^3P_0$ | 3.73 | 9.00 |
| Hg | $\{6^3P_2 \atop 6^3P_0\}$ | 5.4 <br> 4.642 | 10.434 |
| He | $\{2^1S_1 \atop 2^3S_1\}$ | 20.55 <br> 19.77 | 24.581 |
| Ne | "$3P_2$" | 16.53 | 21.559 |
| A | "$3P_2$" | 11.49 | 15.75 |
| Kr | "$3P_2$" | 9.8 | 13.996 |
| Xe | "$3P_2$" | 8.30 | 12.127 |
| Rn | "$3P_2$" | | 10.746 |
| Tl | $6^2P_{3/2}$ | 0.97 | 6.1 |

*Light amplifier action in a helium discharge*

The lowest non-metastable level of He is so high ($2'P_1$ at 21.1 volts) compared to the spacing of the next higher level ($3'S_0$ at 22.9 volts) and compared to the ionization potential (24.58 volts), that two unusual consequences are true.

Firstly, the decay rate $$A(2'P_1 \rightarrow 1'S_0) \approx 10^{10}/\text{sec}$$

while $$A(3'S_0 \rightarrow 2'P_1) \approx 10^7/\text{sec}$$

or 1,000 times slower.

Secondly, the electron temperature in a helium discharge is very high, of the order of 25,000° C. or ~2.5 electron volts average electrons energy at about 1 mm. Hg discharge pressure, up to 200,000° C. at very low pressures ($10^{-2}$ mm. Hg). The Maxwell distribution of kinetic energies in a perfect gas at thermal equilibrium is $$\frac{dn}{n} = 2\sqrt{\frac{E}{\pi}} \frac{e^{-E/KT}dE}{[KT]^{3/2}}$$

So the ratio of numbers of electrons having energies $E_h$ and $E_l$ is $$\frac{dn_h}{dn_l} = \sqrt{\frac{E_h}{E_l}} e^{\frac{-(E_h - E_l)}{KT}}$$

The ratio of excitation rates to the $3'S_0$ and $2'P_1$ levels by electron collisions will be roughly equal to $dn_2/dn_1$. Since $E(3'S_0) - E(2'P_1) = 1.7$ electron-volts and $KT \approx 2.5$ e.v., it will be seen that the rate of excitation by electrons is almost the same for both levels, while the rate of decay from $2'P_1$ to the ground level is almost 1,000 times greater. One may, therefore, expect an excess population in $3'S_0$ over that in $2'P_1$.

This does not take account of factors which will tend to raise the population of $2'P_1$:

Firstly, most of the atoms excited to higher levels must decay via the $2'P_1$ level.

Secondly, the photons emitted during the processes $$2'P_1 \rightarrow 2'S_0$$
$$2'P_2 \rightarrow 1'S_0 \text{ (ground)}$$

will be trapped in the gas and re-excite atoms to $2'P_1$. However, it appears that in at least some instances a pure He discharge will be desirable for use in a light amplifier device according to the present invention. A similar trapped photon situation exists for the Na($7S \rightarrow 3P$) transition.

*Other cases of excitation by collisions of the second kind*

In addition to the selective excitation of Na(7S or 6P) by collision with metastable Hg($6^3P_0$) atoms in a discharge, there are listed in Table II other atomic metals which may be excited by collision with metastables. In each case higher levels of the working element fall near metastable levels of a possible carrier gas. In some cases such "sensitized fluorescence" has already been observed by experimentors. For a fuller understanding of Table II, refer to Table I.

It is obvious that light amplifiers in different frequency ranges will be desired for various different applications and thus this characteristic of the type of discharge utilized, as well as others of its characteristics in addition to its inherent efficiency, will be considered in selecting the medium utilized in a light amplifier.

TABLE II.—SOME COLLISIONS OF THE SECOND KIND

| Carrier Gas | Carrier Metastable Level | Initial Level of Working Atom | Excited Level of Working Atom |
|---|---|---|---|
| Hg | $6^3P_0$(4.642 v.) | Tl ($6^3P_{3/2, 1/2}$) | Several |
| Hg | $6^3P_0$(4.642 v.) | In ($5^2P_{3/2, 1/2}$) | Do. |
| Hg | $6^3P_0$(4.642 v.) | Hg $6^3P_0 \rightarrow 8'S_0$ | (9.20 v) ($\Delta E = 0.08$ v.) |
| | | | $6'P_1 + 4,916$ A.  Photon |
| | | | $6'S_0 + 1,899$ A.  Do. |
| He | $\{2'S_0(20.55 \text{ v.}) \atop 2^3S_1(19.77 \text{ v.})\}$ | $\}$Ne ($2'S_0$) | |
| A | $4^3P_2$(11.49) | Kr ($4'S_0$) | |
| Kr | $5^3P_2$(9.84) | $\{\text{Hg } (6'S_0) \atop \text{Xe } (5'S_0)\}$ | $\}8'D, 8^3D$ |
| Xe | $6^3P_2$ | Hg | |

*Light amplifier transitions from metastable to ground level*

In all the transitions discussed so far, the spontaneous decay rate of the excited level was $>10^6$/sec., characteristic of "allowed" electric dipole radiative transitions. Since the excitation rate is of the order of $10^5$/sec. even using the efficient and selective method of collisions of the second kind, it is evident that the excited level population could not be made greater than the ground level. Thus light amplifier action or emission by mutually-induced transitions could occur only to an intermediate level whose population was kept lower by an even faster rate of spontaneous decay.

It is also possible to depopulate a longer lived lower level by collisions of the second kind, to accomplish the same result.

This situation is in contrast to that of the Maser. For levels spaced only by $E = h\nu$ where $\nu$ is a microwave frequency, the thermal equilibrium population of the excited level is high and the lifetime is long. Therefore, the population of the excited level is easily maintained above that of the ground level.

In the case of levels high above ground (optical transitions), the initial populations will always be low. But if the levels are long-lived (metastable), it may be possible to populate them at a rate greater than the natural decay rate or relaxation rate, and hence to maintain a higher population of atoms in the higher state.

Many of the elements which exist as single atoms in the gaseous state do not have high vapor pressures at convenient temperatures. Therefore, those which may possess metastable states are not useful in exciting other atoms by collisions of the second kind. Nevertheless, it may be possible to use such atoms as working atoms as described above. For this purpose the pressure may be much lower. Most of these metastable levels are listed in Table I.

As an example, consider the case of zinc. The metastable $4^3P$ levels lie about 4 electron-volts above ground as shown in FIG. 14. These levels do not lie close to any other metastable levels and so cannot be excited directly by collisions of the second kind. However, higher, non-metastable levels of Zn, can be excited by collisions with metastable krypton and xenon. From these levels the Zn atoms decay rapidly to the metastable levels as well as the ground level.

The rate of decay of Zn $(4^3P_1 \to 4'S_0)$ by emission of the ultraviolet photon, $\lambda=3076$ A., is $A=1\times10^5$/sec. It has already been mentioned that rates of collision excitation somewhat greater than this may be achievable. Therefore, it should be possible to generate light amplifier transitions directly to the ground level with zinc. One must have $$(N_{high}-N_{low}) \approx N_{high} = \frac{\bar{a}8\pi}{e\lambda^2 f(\nu_0)A}$$

Substitution of values gives $N_{Zn(3P_1)} > 5\times10^{11}$/cm.³. If the atoms are shared by collision among the three metastable levels, the required zinc pressure is only $2\times10^{-5}$ mm. Hg, which is the vapor pressure at about 200° C.

In the case of thallium, most of the atoms may be pumped into the much longer lived $6^2P_{3/2}$ metastable level by a similar indirect mechanism: either collisions of the second kind with Hg metastables or absorption of the 3776 A. resonance radiation with subsequent decay to $6^2P_{3/2}$.

In this case, since $$A(6^2P_{3/2} \to 6^2P_{1/2}) \approx 50/\text{sec.},$$

the density must be quite high: $N \approx 10^{14}$ atoms/cm.³ or $P \approx 3\times10^{-3}$ mm. Hg at a temperature, T 600° C.

Excitation by coincident spectral lines

Previously, the excitation of atoms by resonance radiation was discussed. The emitted spectral lines from a lamp of the same substance necessarily coincide with frequencies absorbed most strongly by the same type atoms in the light amplifier. However, as pointed out in the discussion of sodium excitation, the intensities of lines emitted from the lamp during decay of higher states are quite weak. It was also pointed out that the intensity of certain of these higher resonance lines could be enhanced by collisions of the second kind with metastable atoms. Another way of obtaining strong excitation to higher electronic levels is by accidentally coincident bright emission lines from another atom.

The chance coincidence of two appropriate atomic lines is small. There is room for some 300,000 spectral lines of Doppler width with only slight overlap throughout the visible and near ultraviolet range. There are at most 1,000 useful resonance transitions in convenient atoms and approximately 30 bright atomic lines with which to excite them. Thus, there is about a 10% chance of one good coincidence. At least three moderately close coincidences are known, as shown in Table III.

He $(3^3P \to 2^3S)$ - 3889 A. $\approx$ Cs$(8^3P_{3/2} \leftrightarrow 6^3S_{1/2})$ 3889 A.
Zn _____ 3303.7 A. $\approx$ Na$(4^2P_{1/2} \leftrightarrow 3^2S_{1/2})$ 3303 A.
A _____ 8521.4 A. $\approx$ Cs$(6^2P_{3/2} \leftrightarrow 6^2S_{1/2})$ 8521.2 A.

However, in none of these cases is the overlap good enough for high excitation efficiency. On the other hand numerous examples of the excitation of molecules by coincident atomic lines have been observed.

Information is scarce on fluorescence of molecules containing more than two atoms. Therefore, only diatomic molecules are considered herein.

Each electronic level in a diatomic molecule is split into approximately 50 vibrational levels and each vibration level into approximately 200 rotational levels.

Therefore, we may expect more than 100,000 absorption transitions from populated levels in every molecule on the average. As expected, there is generally at least one coincidence of a bright atomic spectral line with some resonance transition of a given molecule. By the same token the emission from a discharge in a molecular gas is divided into many weak lines. These cannot be excited by an external lamp conveniently.

Materials which transmit U.V. radiation below 2,000 A. are not available. Therefore, the light amplifier process previously described cannot be used, i.e. excitation to a high electronic level with light amplifier emission to an intermediate level whose population is kept low by rapid spontaneous decay to a ground level. Instead the properties of molecules require and permit another mechanism for keeping the lower level population lower than some higher level population. This mechanism is relaxation of the lower level population by collisions of the second kind.

To exemplify the whole process, the molecule $I_2$ is considered (see FIG. 8).

The first member of the sodium principle series at 5893 A. (see FIG. 2) coincides with one of the numerous absorption lines of the iodine molecule. The transition in question is from a rotational sublevel of the $v=2$ vibrational level of the ground electronic state $(\epsilon' g^+)$ up to the $J=30$, $v=17$ sublevel of the $(3\pi_0^+)$ state. The $v=2$ of $(\epsilon' g^+)$ levels are well populated in thermal equilibrium at room temperature (see lower right corner of FIG. 8), while $v=7$ of $(\epsilon' g^+)$ has less than 1% of the population and $v=17$ of $(3\pi_0^+)$ has none.

A 1 cm. thick layer of $I_2$ vapor at a few mm. Hg pressure absorbs most of the Na light and raises $I_2$ molecules to the upper level at a rate $$\frac{dn}{dt} = \frac{P_{avail}}{h\nu}$$

In the absence of light amplifier action, the atoms decay at a rate $$\frac{dn}{dt} = n_h[\gamma_c + \epsilon \text{ (all other states)}]$$

where:

$\epsilon_A$ = spontaneous radiative decay rate,
$n_h$ = population of atoms in the higher energy state, and
$\gamma_c$ = rate of removal by relaxation collisons with other $I_2$ molecules (quenching collisions). The cross-section for these collisions is very high since many $I_2$ states are closely spaced in energy. About 5% of the molecules decay to $v=7$ of $(\epsilon' g^+)$. Then, by the same method of decay as that first described herein, the dynamic equilibrium rates of population change are $$\frac{dn_h}{dt} = 0 = \frac{P_{avail}}{h} - n_h(\gamma_c + \epsilon A)$$

$$\frac{dn_l}{dt} = 0 = n_h A(h \to l) - n_l \gamma_c$$

and $$n_h = \frac{P_{avail}}{h\nu(\gamma_c + \epsilon A)}$$

$$\frac{n_h}{n_l} = \frac{\gamma_c}{A(h \to l)}$$

It is to be noted that atoms can be removed from $v=7$ of $(\epsilon' g^+)$ only by relaxation collisions to other sublevels of the ground electronic state. Then if the $I_2$ pressure ($\sim 5$ mm. Hg) is such that $$\gamma_c \approx \epsilon A_h \approx 20 \times A(h \to l) \approx 10^7/\text{sec.}$$

then $$n_h/n_l \approx 20 > 1$$

which is necessary for light amplifier action.

The further analysis is quite similar to that for the Na$(6P \to 4S)$ light amplifier transition. The values involved are not much different and so for a light amplifier tube 1 cm. diameter x 100 cm. long, the required Na (5893 A.) intensity from a discharge lamp arranged as a jacket is $$I \gtrsim 10^{-3} \text{ watts/cm.}^2 \text{ steradian}$$

As pointed out previously, the intensity in the first line of the Na principle series can easily be made greater than 0.1 watt/cm.$^2$ steradian, with a factor of 100 to spare.

From the above explanation it will be seen that although a light amplifier may be constructed utilizing light energy from one substance to excite a different substance having a coincident spectral line, the known combinations of monatomic substances bordering on coincidence are not promising.

On the other hand, the coincidences of an atomic line with a resonance transition of a molecule often provides a very high degree of coincidence suitable for use as an excitation process in a light amplifier according to the present invention.

An example of such a coincidence usable as an exciting process is the coincidence of the first member of the sodium principal series at $\lambda=5893$ Angstroms which very nearly coincides with one of the absorption lines of the iodine molecule.

Construction of a light amplifier device utilizing this type of excitation would be generally similar to that previously described except that the excitation lamp would be a sodium discharge lamp while the working medium within the cavity would be iodine vapor.

Liquid or solid working substances

The "line" width $\Delta\nu$, of radiative transitions in ions, atoms or molecules within liquids or solids is generally quite broad because of continuous strong interaction with neighboring atoms. The uninterrupted phase lifetime, $$T_2 = \frac{1}{\pi \Delta \nu} \sim 2 \times 10^{-13} \text{ sec. typically}$$

while the spontaneous radiative decay time remains long: $T_1 > 10^{-8}$ sec.

The effect of this is to raise the density of excited atoms, etc. required for light amplifier oscillation. This in turn raises the required illumination intensity for an externally excited resonant light ampifier:

$$I_{\text{available}} = \frac{\bar{a} R 4 h \nu \sum A}{l \lambda^3 f(\nu_0) A}$$

The line shape factor, $$f(\nu_0) = \frac{2}{\pi \Delta \nu}$$

for a Lorentz line, and approximately the same for other line shapes. Thus most condensed systems will require a high power input to excite light amplifier action.

An additional difficulty is that excitations in solids or liquids are usually "quenched" by non-radiative processes.

One should accordingly use substances which fluoresce (reradiate) with high quantum efficiency. Some substances which absorb the powerful Na (5893 A.) line and fluoresce efficiently are the merocyamine dyes, fluorescein, Meldola blue, and Rhodamine "B." More promising are certain substances in which the electrons which take part in the excitation lie in the interior of the atoms or ions concerned and are shielded from environmental perturbations. Such substances, including the porphyrins, ruby, and rare earth ions have much narrower lines.

The use of a polycrystalline solid entails the refraction and reflection of a light wave at the crystal interfaces, preventing the lossless reflection of a wave back and forth between light amplifier reflectors. To avoid this a single crystal ruby could be used.

Figure 9:
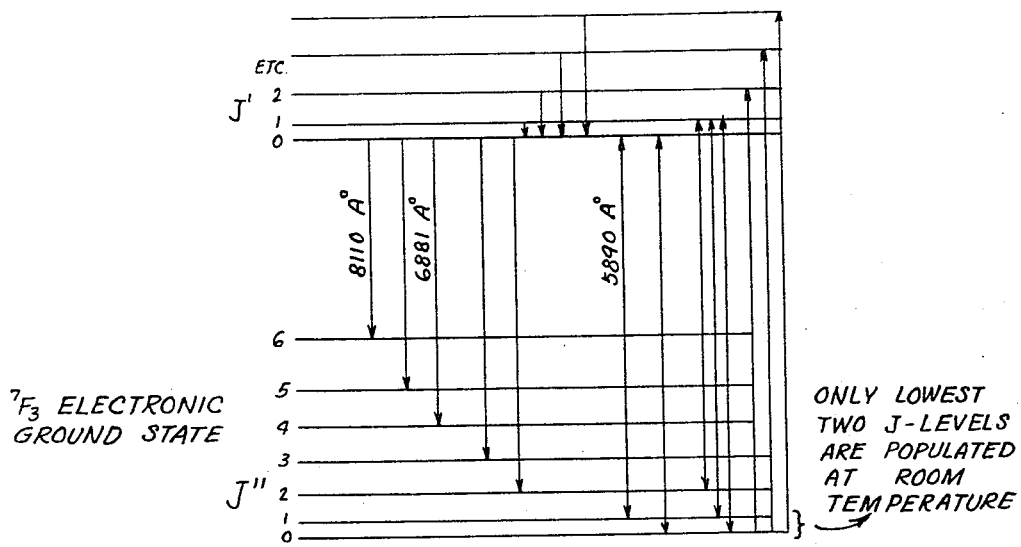
FIGURE 9 is a diagram of the energy levels of the Europium ion, $Eu^{+++}$, useful in describing a form of the invention utilizing a non-gaseous working medium.

The difficulties inherent in the use of solid or liquid working mediums may be minimized by use of, for example, the rare earth ion, $Eu^{+++}$, in liquid solution. The angular momentum sublevels of the first two electronic states are shown in FIG. 9.

The J-sublevels are further split into states and one of the components of the $J'=0 \rightarrow J''=1$ transition overlaps the Na 5893 A. line. The upper J-levels are rapidly quenched to the lowest two J-levels ($\gamma \approx 1.5 \times 10^{12}$/sec.) but transitions between the upper and lower electronic states occur only by radiative emission at the slow "forbidden" rate, $\gamma \approx 10^3$/sec., in the case of europium sulfate in water.

The ions may be excited by sodium radiation to $J'=0$ and decay to any of the $J''$ levels. The two strongest fluorescent transitions at $\lambda=8110$ A. and 6881 A. are suitable for a liquid filled light amplifier.

The J-quenching interaction gives rise to a line width $\Delta\nu \approx 5 \times 10^{11}$ cycles per sec. or $\Delta\lambda \approx 6$ A. This line width is much sharper than those of other condensed fluorescent substances but broad compared to the spectral lines emitted by atoms in a low pressure discharge ($\Delta\lambda \approx 0.01$ A.). Therefore, one may artificially increase the power of the Na discharge lamp to get the necessary power without worrying about line distortion.

The necessary intensity of illumination is given by the equation for I available above and is between 0.1 and 1.0 watt/cm.-stere. A commercial "General Electric" lamp with broadened and reversed sodium lines emits just about this intensity.

Thus it appears that when for particular applications a condensed working substance, such as a liquid is desirable, such a working substance may be utilized in a cavity such as shown in FIG. 4, one example of such a working substance being europium sulphate in water. Excitation would be provided by a sodium discharge lamp similar to commercially available types with a broadened sodium line and emitting an intensity of between 0.1 and 1.0 watt per cm.$^2$-stere.

It will be appreciated that the various types of excitation discussed, such as excitation by resonance radiation, excitation by discharge within the cavity, etc., are generally applicable to both the nonresonant and resonant type of light amplifier apparatus, as are the various possible working mediums discussed.

Communication system

Figure 10:
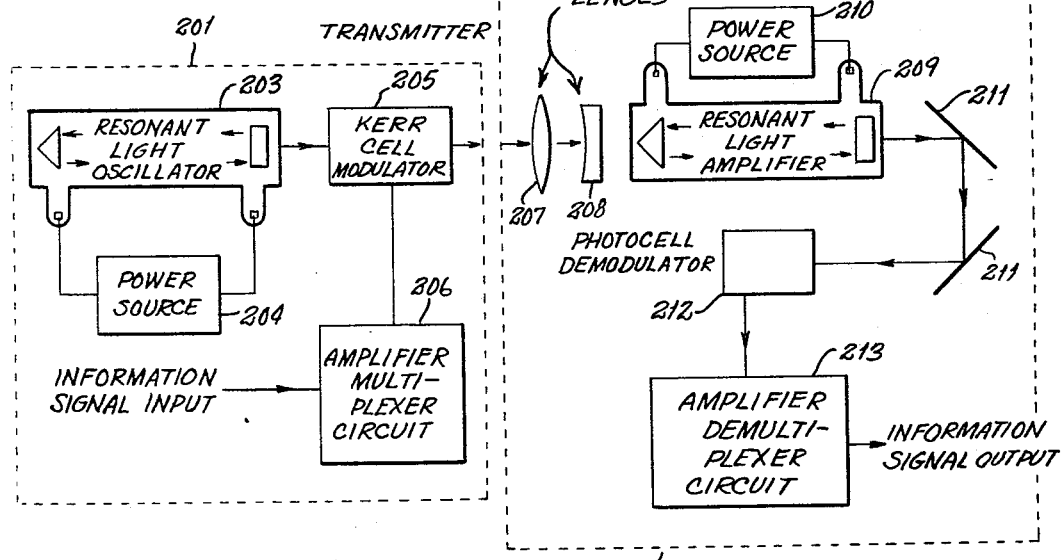
FIG. 10 is a schematic diagram of a communication system incorporating resonant light amplifiers and oscillators.

FIG. 10 shows apparatus providing a communication system and utilizing a resonant light oscillator according to the present invention.

Transmitter apparatus is indicated enclosed in dashed lines at 201. Receiver apparatus is shown enclosed in dashed lines in the block designated 202. Obviously, the transmitter and receiver would be separated by some distance depending upon the particular application for which the communication system is to be used.

In the transmitter apparatus 201, there is incorporated a resonant light oscillator 203, which may be any one of the various forms previously described. The oscillator 203 is provided with a power source 204, and produces a light output in the form of a highly collimated beam of light having a quite narrow frequency bandwidth.

As previously explained, the wavelength (and, accordingly, the frequency) of the light produced will depend upon the medium utilized within the light oscillator. The particular application for which the apparatus is to be used will influence the selection of the medium within the oscillator in order to obtain light of a wavelength approximating that which is desirable in the particular case. For example, it may be desired to select the wavelength to minimized atmospheric absorption, particularly that due to fog, clouds, etc. in other instance, atmospheric absorption may not present a great problem and it may be desired to select the most efficient medium for production of light energy regardless of wavelength of the light output.

The output from the light oscillator 203 is passed through a Kerr cell modulator 205. The characteristics of a Kerr cell are well known and will not be explained in detail. It will suffice to say that the Kerr cell provides an apparatus capable of being used as an electronically operated shutter for controllably presenting an opaque or a transparent cross-sectional area in the path of a light beam, thus allowing it to be turned off and on.

The Kerr cell has capabilities of operating at a rate on the order of 1,000 megacycles per second. Thus, it will be seen that the combination of the light oscillator and the Kerr cell may be utilized to produce a light beam modulated at a high frequency in response to an electrical input to the Kerr cell modulator.

The use of a Kerr cell involves the polarization of the light transmitted, and in FIG. 10 there is illustrated a polarizing filter 20 placed within the oscillator 203. This filter assures that the light ouput of the amplifier will be polarized thus obviating the necessity of polarizing the light output by external means.

Various advantages accrue by reason of the placement of the filter 209 within the enclosure of the oscillator 203. The filter 200 causes losses for light of unwanted polarization to be sufficiently great so that self-sustained oscillations for light of the unwanted polarization will not occur. As the emission is coherent with the respect to polarization, practically no generation of light of unwanted polarization will occur.

The available power is therefore substantially all utilized in producing the desired polarization and the energy normally required (amounting to approximately one-half the total) for producing the unwanted polarization is conserved.

In addition, any problem of heat dissipation in the filter is avoided as the filtering takes place prior to buildup of high energy density. Obviously, the conventional technique of filtering the light output from the oscillator could be used if for any reason this was desired.

An amplifier and multiplexer 206 may be provided to supply a modulating signal to the Kerr cell 205. The information signal to be transmitted over the communication system is supplied to the amplifier multiplexer circuit 206. Normally, the information signal will be transmitted over numerous channels and combined in the multiplexer circuit.

The multiplexer is used to utilize the information transmitting capabilities of the system but is not essential for the operation of the system and the particular form of multiplexing apparatus utilized does not form a part of the present invention. The desirability of utilizing some multiplexing system to combine a number of signals of relatively narrow bandwidth into a single signal having a very wide bandwidth may be appreciated by a comparison of the possible bandwidths with a typical high information carrying signal. A light communication system with a bandwidth on the order of 1,000 megacycles would have the capability of carrying approximately 100 or more television channels of 6 megacycles each.

A particular advantage arises from the composition of the resonant light oscillator with the Kerr cell modulator from the fact that the light output from the resonant light oscillator basically has a very narrow spectral line of very high frequency. The Kerr cell must by its nature be designed for optimum operation at a particular wavelength and becomes inefficient or inoperative for wavelengths differing substantially from the optimum. Since the output of the oscillator 203 lies within a relatively narrow spectral line even when 1,000 megacycle modulation sidebands are added, it falls well within the fractional range of wavelengths for which the Kerr cell modulator operates efficiently.

The Kerr cell modulator also operates most efficiently for a highly collimated beam of light and the output of the resonant light oscillator also has this characteristic in a very high degree.

From the foregoing explanation, it will be seen that the transmitter 201 produces a modulated beam of light capable of carrying a large quantity of information in a bandwidth on the order of 1,000 megacycles or larger. From previously explained characteristics of the resonant light oscillator, it will be understood that the light energy is concentrated within an extremely small solid angle such that it will diverge by an amount which may be limited to 1 centimeter per kilometer or less (neglecting atmospheric effects which would have to be appropriately evaluated).

The receiver 202 may be provided with light gathering lenses 207 and 208, to increase the target area from which light intercepted from the transmitter will be supplied to the receiver. Obviously, other light gathering arrangements such as reflectors might also be used. In some cases, as in the case of short range transmission, light gathering apparatus may be unnecessary.

A resonant light amplifier 209 is arranged to amplify the light from the light-gathering lenses 207 and 208. The resonant light amplifier may be of any of the forms previously described but obviously will be selected to be compatible with the oscillator in the transmitter 201. The amplifier 209 is provided with a suitable power source 210.

The light output from the amplifier 209 may be taken from the end opposite the lenses 207 and 208 and directed by mirrors 211 if desired to a photocell demodulator 212. If preferred, the photocell demodulator 212 could be placed immediately adjacent to or incorporated as a part of the amplifier 209, or receive the beam directly without preamplification.

The photocell demodulator 212 may comprise any appropriate photoelectric, photoconductive or other photosensitive conversion apparatus for converting the light output of an amplifier 209 to an electrical output. The frequency response of the demodulator 212 should obviously be high enough to accommodate the bandwidth transmitted by the transmitter 201. The photocell apparatus 212 automatically acts as a demodulator in the sense that it is obviously incapable of producing an output of light frequency and accordingly produces a signal having the relatively much smaller modulation frequency.

The signal from the demodulator 212 must be supplied to an amplifier demultiplexer circuit 213 if a multiplexer is used at the transmitter. The amplifier demultiplexer 213 is the companion to the amplifier multiplexer 206 in that it is adapted to separate from a single channel the various signals of lower bandwidth which were combined in the multiplexer 205.

From the foregoing explanation, it will be seen that a communication system is provided which has a high efficiency and a very high information-carrying ability. The range of the system may be quite long, particularly in applications where atmospheric absorption would not be excessive. Even where atmospheric effects are troublesome, the wavelength of the light utilized can be selected in such a way as to substantially reduce difficulties from this source.

The system has a further advantage over wireless communication systems commonly in use in that the transmission path is limited virtually to a narrow cone which may not exceed more than a few feet at a widest point thus effectively preventing unauthorized interception of the information transmitted by the system. This characteristic in the system would normally make unnecessary scrambling apparatus and the like utilized to discourage interception of information in commercial communication systems.

It will be understood that the receiver may comprise any suitable photosensitive converter and need not include the resonant light amplifier 209. Similarly, the oscillator 203 need not be modulated by a Kerr cell but may be modulated in other fashions.

For example, modulation may be accomplished simply by modulating the "pumping" power source, if desired, although the modulation frequency so produced would be quite limited compared to the Kerr cell frequency bandwidth.

Frequency modulation of the resonant light oscillator output may be achieved by changing pathlength between reflectors; the frequency being highly dependent on this pathlength. For example, a reflector could be secured to or formed as a part of a piezoelectric crystal so that mechanical oscillation of the crystal would cyclically vary the pathlength between reflectors and accordingly frequency modulate the output.

Alternatively, the transition frequency of the working atoms, ions or molecules may be varied by means of magnetic or electric fields in the cavity (Zeeman or Stark effects). Such fields may be produced by a coil around the cavity, condenser plates on opposite sides of the column of working medium, or by placing the optical cavity in an electrical cavity or wave guide carrying the modulation signal. A change in the transition frequency will change the oscillation frequency.

In addition to making possible a frequency modulation instead of amplitude modulation of the light beam, these alternative modulation schemes may have other advantages such as power conservation and more convenient circuitry.

A frequency modulated light signal may be converted to amplitude modulation by passage through an optical filter having an acceptance frequency centered at or near the edge of the frequency swing of the frequency modulated light signal. For example, a resonant light preamplifier at the receiver would serve as a filter having the required frequency sensitivity.

Frequency or time measuring device

FIG. 12 shows apparatus for measuring frequency or time utilizing the constant frequency characteristic of the light output from the nonresonant-type light oscillator.

Two nonresonant light oscillators 301 and 302 are energized respectively by coils 303 and 304 which create discharges within the oscillators. The coils 303 and 304 are connected by leads 305 and 306 to a suitable source of radio frequency power. The light oscillators 301 and 302 are provided with gas fills as indicated at 307 and 308, which are excited by reason of the discharge generated therein. Egress for light energy from the light oscillators is provided by respective windows 311 and 312 through which the output of the oscillators is transmitted.

It will be understood that the oscillators 301 and 302 need not be of the radio frequency excited type but may be any type of light oscillator disclosed hereinbefore or any variation thereof. The oscillators 301 and 302 are, however, preferably of the nonresonant type as they are not particularly affected in frequency by changes in the dimensions of the cavity. The resonant light oscillators have an output frequency which is highly dependent on the distance between reflectors (i.e., the "cavity" dimension). This frequency dependence on dimension would normally render the resonant oscillator unsuitable for this frequency standard application, although in special circumstances this may not be so.

Lenses 313 and 314 are used to direct the light outputs from the oscillators 301 and 302 to a common point on the input of a photoelectric detector 315. The frequencies of the light output from the oscillators 301 and 302 (or their harmonics) differ by an amount within the frequency response of the detector 315.

Different frequencies may be obtained from the oscillators 301 and 302 by utilizing different gas fills 307 and 308. In some cases, the gas fills 307 and 308 may be the same and a different transition may be selected by means of filtering, or any other suitable technique may be utilized for providing suitably differing frequency outputs from oscillators 301 and 302.

The outputs from the oscillators 301 and 302 falling on the input of the detector 315 will cyclically interfere and reinforce at a rate equal to their frequency difference or the frequency difference of their harmonics. In other words, the two beams will heterodyne to produce a difference frequency which must of course be within the frequency response of detector 315.

It will be appreciated that any departure in frequency by either of the oscillators 301 or 302 will represent a percentage departure in the heterodyne frequency detected by detector 315 which departure will vary percentagewise inversely as the heterodyne frequency; accordingly, the heterodyne frequency should generally be selected to be as high as possible. It may, therefore, be desirable to use a detector 315 which utilizes microwave techniques thereby allowing a maximum heterodyne frequency on the order of a thousand megacycles.

Any suitable indicator 316 or other utilization device may be provided in accordance with accepted frequency standard techniques. For example, the frequency output of the detector or a submultiple thereof may be counted cycle by cycle to provide a direct and highly accurate comparison of frequencies.

The long-term accuracy of the frequency standard apparatus of FIG. 12 is theoretically predictable to be as high as 1 part in $10^{11}$ or better under certain conditions. This is considerably better than presently available microwave frequency standards and may be appreciated by the fact that it represents a variation less than one second from the year 1000 B.C. to the present (one second in 3000 years). The apparatus of FIG. 13 also provides a practical frequency standard in the region of light freqencies where none exists at present.

Interferometric apparatus

FIG. 13 shows apparatus for measuring distances using the techniques of interferometry and incorporating a nonresonant light oscillator according to the present invention.

A nonresonant light oscillator 321 is provided with an excitation coil 322 connected by means of electrical leads 323 to a suitable source of radio frequency energy thereby producing a discharge within the oscilator 321. The oscillator 321 is provided with asuitable working medium 324 and has a window 325 from which the light output of the oscillator is available. The oscillator 321 may be of the type described in connection with FIG. 12, or as in the case of FIG. 12, any type of light oscillator previously described or suggested hereinabove may be utilized for the light oscillator 321.

Suitable means is provided for directing the light from the oscillator 321 into a beam, such as a collimating lens 326. Light rays are indicated at 327 emerging from the lens 326 after having been collimated thereby.

The rays 327 strike a semi-transparent mirror 332 and are thereby reflected in part in an upward direction as indicated by the arrows 328 and are in part transmitted through the mirror 332 as indicated by the arrows 329. The rays indicated by the arrows 328 are substantially totally reflected from a mirror 333 and once again strike the semi-transparent mirror 332 and are partially transmitted to form a part of the beam indicated by the arrows 331. The portion of the light rays indicated by arrows 328 which is reflected from the mirror 332 does not enter into the operation of the apparatus.

The rays indicated by the arrows 329 are reflected by a mirror 334 which is movable by a suitable translating mechanism such as the screw thread mechanism indicated at 335 and the rotatable handle at 336. The mirror 334 is moved in a direction perpendicular to its surface so that the path length of the rays indicated by arrows 329 is changed by the movement of the mirror 334 (to the position indicated at 334′, for example). After reflection from the mirror 334, the rays indicated by arrows 329 are partially reflected from the semitransparent mirror 332 and combine with the transmitted portion of the rays indicated by arrows 328 to form the beam of rays indicated by the arrows 331. The portion of the beam of rays indicated by arrows 329 which is transmitted though semi-transparent mirror 332 does not enter into operation of the apparatus and is not shown. It will be observed that the pathlength of the rays indicated by arrows 328 is constant while the pathlength of the rays indicated by arrows 329 is variable and the variation in this length is equal to twice the movement of mirror 334.

The rays indicated by arrows 331 are directed to a photosensitive detector 337, which is in turn connected to a fringe counter 338.

As the mirror 334 is moved, the rays indicated by arrows 328 and 329 will alternately interfere and reinforce, thus producing alternate increases and decreases in the amplitude of the light striking the photosensitive detector 337. These so-called fringes produced by interference may be counted by the fringe counter 338 responsive to the amplitude of the output of the photosensitive detector 337. Each cyclic variation from maximum to minimum and return, or in other words, each fringe, will represent a movement of the mirror 334 equal to one-half wavelength of the light from the oscillator 321. The fringe counter thereby indicates directly the movement of mirror 334 in terms of half wavelengths of the light from oscillator 321. The wavelength of light from oscillator 321 will be known to a high degree of accuracy and the indication on the fringe counter 338 may thus be converted to any desired units of measure.

The above interferomertic apparatus utilizing a nonresonant light oscillator, as previously described, is particulaly advantageous in that it allows measurement of greater distances than apparatus utilized heretofore. The maximum distance which can be measured by such apparatus, that is, the maximum measurble movement of mirror 334, is limited by the fact that a light source has a finite width of spectral line, or in more general terms a finite bandwidth. In other words, the light from any source is composed of light of a number of frequencies. Thus, when the length of the path of the light is changed by a sufficient amount, portions of the light will begin to interfere where other portions reinforce, and vice versa; so that it eventually becomes impossible to detect the interference fringes due to overlap of interference rings and fringes from light of slightly different frequencies.

Obviously, the more narrow the bandwidth of the light utilized, the greater the distance that can be measured before this effect becomes troublesome and prevents further counting of fringes and measurement of distance thereby. Nonresonant light oscillators such as indicated at 321 have a very narrow bandwidth on the order of 10 megacycles or less and, accordingly, provide a maximum measurable distance considerably greater than heretofore possible.

As an example of the utility of increased accuracy of interferometric distance measurements, the possibility of ruling diffraction grating longer than the present 10-inch limit can be cited. A longer grating can resolve more closely spaced spectral lines.

From the foregoing explanation, it will be understood that the apparatus shown in FIG. 13 provides interferometric apparatus for the measurement of distance which is capable of measuring greater distances without sacrifice of accuracy than had been possible with interferometric apparatus using other sources of light.

*Resonant light amplifier for generation of transient pulses*

For particular applications it may be desired to operate resonant light amplifier apparatus to generate transient pulses of light energy. Such pulses will generally have the characteristics of the output of the previously described resonant light oscillator, namely narrow frequency bandwidth, near planarity of wave shape, etc. In addition, the transient pulses will have their energy concentrated in a very short time. This time period may be shorter than $10^{-8}$ seconds. The length of the pulse may, of course, be longer and is subject to control, as is the shape of the pulse to some extent, all as will later be explained. The intensity of the pulse will be considerably higher than light intensity obtained with comparable apparatus in steady state operation. The light amplifiers of either the resonant or nonresonant type can, of course, be operated in pulse fashion simply by pulsing the source of exciting energy such as the light excitation or the electrical discharge excitation. This type of pulse operation does not, however, achieve the full advantages of pulse operation. It is rather preferred that the light amplifier apparatus be maintained with the working medium activated so that under proper conditions sustained oscillation could be produced. By sustained oscillations it is meant that regeneration could take place which would produce self-sustaining oscillation even though for a very short length of time.

The activated working medium in such condition contains a substantial amount of energy due to the presence of atoms, ions, or molecules at a higher energy level which are capable of a transition to a lower energy level upon stimulation by electro-magnetic radiation of the proper frequency. This stored energy can be released in a short time interval and is of a much greater magnitude than the relatively small amount of energy which would be added to the working medium by the source of exciting energy during an equally short time interval (as in normal, continuous operation).

Several mechanisms may be utilized to control resonant light amplifier apparatus to achieve this type of pulse operation.

One way of achieving the above type of pulse operation is by changing the effective number of excess excited atoms by means of the Zeeman or Stark effect. This may be accomplished by producing a sudden change in the magnetic or electrical fields, respectively.

Pulse operation can also be achieved by suddenly changing the resonant frequency of the working medium by the Zeeman or Stark effect (by changing the magnetic or electrical field in the cavity, for instance).

Pulsing may also be achieved by the use of a shutter mechanism, preferably an electronic arrangement, such as a Kerr cell, to effectively attenuate the light in the closed path of the resonant light amplifier so that the losses are great enough to prevent self-sustained oscillation for certain conditions of the shutter.

It is noteworthy that the same effects outlined above for pulsing purposes may be used to rapidly alter the gain of a light amplifier used as an amplifier. In the non-linear region of operation, harmonics of the modulation frequency would be generated.

Suitable apparatus for pulsing a light amplifier to produce transient pulses by means of the Zeeman effect may be provided by placing a resonant light amplifier between two "Helmholz coils." A magnetic field can then be generated through the resonant light amplifier which can be controlled so that it may be reduced to zero in a time of the order of $10^{-8}$ seconds. Obviously, magnetic fields of rapidly changing magnitude might also be impressed through other means such as microwave waveguides or cavities.

The effect of the magnetic field is to split certain energy levels into several sub-levels and thus reduce the number of atoms which may take part in a transition at a given frequency. For example, if the upper energy level with which one is concerned is split by a magnetic field (as in the case of $Na(6P \rightarrow 4S)$), for example, the number of atoms whose transitions may be induced by a given light frequency may be reduced below that necessary for a self-sustaining oscillation.

A triggering action is, therefore, produced when the previously split levels are suddenly brought to the same energy by reduction of the magnetic field.

In the case of molecules, most molecules have a very small magnetic dipole moment in the ground electronic state. (One exception is [NO] with a $2\pi_{1/2}$ ground state and a promising transition in the ultra-violet.) Many excited molecular states do have an electronic magnetic moment and the Zeeman effect would be large. This is not the case, however, for the excited state of interest in the iodine molecule previously discussed. In the case of polar molecules, there is a large electric dipole moment, and in such cases the Stark effect can be used to trigger a transient pulse. This is accomplished by a changing electric field.

The Zeeman or Stark effect can be utilized for producing transient pulses in a different manner by utilizing the shift of resonant frequency of the working medium which is occasioned by changing the magnetic or electric field, as the case may be. As the field is increased, the resonant frequency changes. Thus, a field of only 100 gauss may be used to detune the light amplifier to allow the excited state concentration to build up preparatory to the generation of a pulse upon collapse of the magnetic (or electric) field.

The detuning and tuning principle of pulsing may also be instrumented by changing the physical characteristics of the resonant light amplifier. For example, a metal surface may be deposited on a piezoelectric crystal to form a mirror reflector. If this is utilized as one of the reflectors in the resonant light amplifier and the mirrored surface is such that it can be electrically controlled to displace perpendicular to its surface, then the physical resonant frequency of the light amplifier can be changed. If the difference between resonant frequencies of the resonant light amplifier optical system is of the same order as the transition line, and if the resonance is tuned off one side of the line, then a sudden shift in tuning to the line center will trigger a transient pulse.

A further and particularly simple and effective means of generating transient pulses in a resonant light amplifier is shown in FIG. 15. In FIG. 15 a resonant light amplifier is shown comprising an enclosure 401, the interior 402 of which is filled with a suitable one of the working mediums previously described. In FIG. 15 the excitation means and reservoir are omitted for simplicity. Within the enclosure 401 there is a prism 403 similar to that shown in FIG. 5 and described with reference thereto. A window 404 is located at the opposite end of the enclosure 401. Another similar reflecting prism 405 is provided, and in the apparatus of FIG. 15 is shown outside the enclosure of 401. It will be understood that the reflecting prisms 403 and 405 can alternatively be either both within the enclosure or both outside the enclosure.

As explained in detail with reference to FIG. 5, the prisms 403 and 405 are arranged so that incident light rays indicated by arrows 408 strike their respective faces 406 and 407 at or near Brewster's angle for the prism and its environment. With this arrangement light of a particular polarity is transmitted through and internally reflected within the prism while light of other polarity is partially reflected externally from the respective faces 406 and 407. Thus, a low-loss closed path is provided only for a light of a particular polarity.

The apparatus of FIG. 15 differs functionally from the apparatus of FIG. 5 in that a Kerr cell 411 is placed in the closed light path so that all light traversing the closed path passes through the Kerr cell 411.

The Kerr cell is electrically energized from a pulse generator and timer 412. As will presently be seen, the Kerr cell controls the pulses of light output and, accordingly, the pulse generator and timer 412 will be designed to produce pulses of the proper duration and occurring at the desired time to produce light pulses of the characteristic desired in a particular application.

The construction of Kerr cells is well known and will not be explained in detail. It will suffice to say that in one form the Kerr cell comprises a number of conductive plates (preferably oriented at 45° to the plane of the paper in FIG. 15) connected as by leads 413 to a source of electrical potential such as the pulse generator and timer 412. The spaces between the conductive plates 414 is occupied by a dielectric (usually liquid) such that electrification of the plates 414 to produce an electric field in the dielectric causes a change in polarization of a plane polarized wave passing through the Kerr cell, as a result of the well known Kerr effect.

Prisms 415 are provided at the ends of the Kerr cell 411 so that the light rays indicated by the arrows 408 enter the Kerr cell at an angle substantially equal to Brewster's angle with both external and internal faces of the prism 415; this minimizes reflection from the faces of the prisms 415 and thus reduces the loss of light due to the introduction of the Kerr cell in the system.

It will be understood that since a nearly unattenuated closed path is provided for light of a particular polarity in FIG. 15 and that light of a different polarity is partially reflected out of the closed path, energization of the Kerr cell to produce a shift of polarization of the light passing therethrough will cause substantial loss of light energy on the closed path due to reflection from the faces 406 and 407 of the prisms 403 and 405, for example. The polarization can be changed by the Kerr cell in different manners; it can be changed to circular polarization, or it can be shifted through a new polarization angle at 90° to the original, or it can be otherwise changed. Any change in polarization will introduce attenuation of the light rays, the maximum attenuation being obtained by a 90° change in plane polarization angle.

Accordingly, when the Kerr cell 411 is energized losses of energy from the resonant light amplifier will prevent oscillation from building up even though an excess population exists in a higher energy level from which self-sustaining stimulated emission would occur due to transitions from a lower energy level if the conditions of energy conservation in the system were near optimum. Thus, if the Kerr cell under these conditions is suddenly deenergized to reduce the energy loss rate, the energy represented by the higher population in the upper energy level will be rapidly dissipated by regenerative stimulated emission, creating a pulse of light energy in the resonant light amplifier.

As in the case of the apparatus of FIG. 5, an output can be obtained from the light amplifier of FIG. 15 by rendering the face 407 of the prism 405 partially reflective. This can be done by the application of a partially reflected coating, or may alternatively be accomplished by rotating the prism 405 through an axis perpendicular to the paper so that the rays indicated by arrows 408 do not strike exactly at Brewster's angle but at a slightly different angle, thus resulting in partial reflection from the face 407 of the prism 405 and producing output rays indicated by arrows 409.

The apparatus shown in FIG. 15 and described above is particularly advantageous in that the Kerr cell is capable of actuation in time intervals as shown as $10^{-9}$ seconds.

It should be noted incidentally that the apparatus of FIG. 15 is suitable with a substitution of a proper modulating circuit for the pulse generator 412 for use as a very efficient modulator for a resonant light amplifier used either as an oscillator or an amplifier. Thus, the apparatus of FIG. 15 slightly modified may be utilized as an alternative form of oscillator in the transmitter of the communication system shown in FIG. 10.

The apparatus of FIG. 15 produces an output which in general has the same characteristics of the output of a nonresonant light amplifier, as in FIG. 5, for example. In addition, however, the output is capable of being pulsed with very short pulse times in FIG. 15. Also in the apparatus of FIG. 15 the peak pulse intensity is much higher than the intensity obtainable from the non-pulsed nonresonant light amplifier such as shown in FIG. 5. This increase in power results from the fact that substantial energy is stored in the interior 402 of the light amplifier enclosure 401 when the working medium therein is maintained at an excited state. This energy is releasable in a very short pulse by means of the Kerr cell 411 thus providing a very high peak power intensity.

*Non-reflecting nonresonant light amplifier*

In the discussion hereinabove, pulsed light amplifiers were discussed wherein a closed light path was provided by means of reflectors and the amplifier operated in basically the same fashion except that short time pulse operation was created, as by means of the Kerr cell in FIG. 15, for example.

In the previously explained operation of light amplifier devices, the stimulated emission added coherently to the inducing radiation. Except for the refraction effects, a wave-train traveling through an activated light amplifier medium is linearly amplified as long as the density of excited atoms (or ions or molecules) remains substantially unchanged and provided the transition is not "power broadened." By means of operation outside the above limits, different effects are produced (e.g. non-linear amplification), and apparatus utilizing these effects has capabilities beyond those of the previously discussed light amplifier devices.

Apparatus for producing light pulses by the utilization of light amplification in a light amplifier with non-reflecting walls is shown in FIG. 16. A pulsed resonant light amplifier is indicated schematically at 421. This amplifier may be constructed in accordance with previously described principles, for example, in accordance with FIG. 15 and the description thereof.

The pulsed resonant light amplifier 421 is controlled by a pulse generator and timing circuit 422 as previously explained in connection with FIG. 15.

The output from the pulsed resonant light amplifier 421 is in the form of light pulses indicated by arrows 423.

These light pulses are directed as desired such as by the lens 424.

In order to take maximum advantage of the amplification effect in a non-reflecting, nonresonant light amplifier according to the present invention, it may be desired to provide the non-reflecting amplifier with a light pulse having as short a rise time as possible. Otherwise, some of the energy stored in the non-reflecting amplifier will be expended in amplification of the low intensity leading portion of the input pulse.

Accordingly, a very high speed shutter arrangement is illustrated in FIG. 16 for obtaining a pulse output having a very short rise time. Whereas the rise time of the pulsed resonant light amplifier 421 may be on the order of $10^{-8}$ seconds, the shutter 425 may be constructed to have an output having a rise time on the order of $10^{-11}$ seconds.

A shutter 425 comprises a mirror 426 which is very rapidly rotated about an axis indicated at 427. An opaque member 428 is provided having a narrow slit 430. For the position of the mirror 426 shown in FIG. 16, the rays 423 from the pulsed resonant light amplifier 421 are focused on the slit 430 and accordingly pass through the opaque member 428. As the mirror 426 is rotated, the rays from the amplifier 421 are swept across the opaque member 428 and periodically, for a very short time interval, pass through the slit 430.

The width of the slit 430 is preferably that of the width of the Fraunhofer pattern for the light beam at that particular point. The width of the Fraunhofer pattern will be greater as the distance of the opaque member 428 from the mirror 426 is increased. This distance may be set at any convenient value and, if desired, the path of the light rays 423 may be folded by the use of mirrors or the like in order to make the shutter apparatus of manageable size. For example, if the opaque member 428 is placed 10 meters away, the width of the Fraunhofer pattern will be approximately $\frac{1}{10}$ of 1 millimeter. The cutting of a slit of this width in the opaque material 428 presents no difficulties.

The mirror 426 is preferably rotated at a very high speed to obtain a pulse having a very short rise time from the shutter 425. If the velocity can be raised to $10^6$ radians per second, a pulse of approximately $10^{-11}$ seconds can be obtained. Known techniques for obtaining high rotational velocity can be utilized in the construction of the rapidly rotating mirror 426. For example, the mirror can comprise a ground "flat" on a small metal cylinder and can be placed in an evacuated enclosure and provided with a substantially frictionless suspension. If desired, magnetic suspension can be utilized. The mirror may be brought to a high rotational velocity by a rotating magnetic field.

It will be understood that the particular shutter arrangement described with reference to FIG. 16 is a preferred form which is capable of attaining a very short rise time for the output pulse from the shutter. The operation of the nonresonant non-reflecting light amplifier of FIG. 16 is not limited to use with such extremely high speed shutters. Thus, in many instances a slower and relatively simpler shutter such as a Kerr cell may be used to provide a light pulse to the non-reflecting amplifier tube. Furthermore, although a resonant light amplifier provides a desirable type of light source for pulsing the non-linear light amplifier tube, any other light source of appropriate frequency could be utilized if controlled to give appropriate short duration light pulses.

The light on the shutter 425 is directed as by means of a lens 429 into a non-reflecting light amplifier tube 431. The amplifier tube 431 comprises a closure 432 having an input window 433 and an output window 434. The interior 435 of the non-reflecting light amplifier tube is filled with a suitable working medium. When utilized in conjunction with a pulsed resonant light amplifier 421, the working medium of the non-reflecting light amplifier tube 431 will generally be the same as that of the pulsed resonant light amplifier 421. In any case, the working medium of the amplifier tube 431 will be such that it is stimulated by the exciting light introduced through the input window 433.

The output from the non-reflecting light amplifier tube 431 is projected out through the output window 434.

The nonresonant non-reflecting light amplifier apparatus of FIG. 16 operates as follows.

The operation of the pulsed resonant light amplifier 421 and of the shutter 425 have previously been explained. It should be noted that the shutter 425 should be synchronized with the pulse of the pulsed resonant light amplifier 421 so that the open condition of the shutter 425 occurs as nearly as possible to the maximum intensity of the light pulse from the pulsed resonant light amplifier 421. This function is accomplished by the pulse generator and timing circuits 422.

Light pulses from the shutter 425 pass through the lens 429 where they are collimated. The collimated light pulse passes into the non-reflecting light amplifier tube 431 through the input window 433. In FIG. 16 the excitation means for the non-reflecting light amplifier tube 431 is omitted for simplicity. It will be understood that the working medium in the interior 435 of the amplifier tube 431 will be excited so that there is an excess population of atoms, ions, or molecules in an upper one of two energy levels separated by the frequency of the stimulating light from the pulsed resonant light amplifier 421. The activation energy for the working medium in the light amplifier tube 431 may be provided by light energy introduced through the wall 432, by an internal discharge, or by any other means such as those described hereinbefore.

It will be noted that reflection means are not included within the light amplifier tube 431 as they were in previous light amplifiers explained hereinabove. Accordingly, light photons emitted within the light amplifier tube 431 are not normally reflected to retraverse the interior 435 of the light amplifier tube 431. Usually a photon emitted will thus traverse less than the length of the light amplifier tube before being transmitted to the exterior or absorbed.

Accordingly, there is little opportunity for regenerative action within the light amplifier tube, and a considerable excess population of atoms (or ions or molecules) in the upper two energy levels can be achieved and maintained without spontaneous regenerative oscillation in the light amplifier tube.

When this condition exists in the light amplifier tube 431, it is conditioned to act as an amplifier. Such a non-reflecting nonresonant light amplifier is capable of amplifying light with a frequency bandwidth smaller than the corresponding transition bandwidth of the atoms, ions, or molecules of the working medium, but larger than the resonance response bandwidth of a resonant light amplifier. Also, wave-trains with non-planar wave fronts may be coherently amplified. For example, a diverging spherical wave may be amplified without changing its shape. Such a wave would not be accepted by a resonant light amplifier with planar specular reflectors. Of course, a resonant light amplifier may be constructed with reflectors of other than plane shape for amplifying non-planar waves. However, the more flexible non-reflecting non-resonant amplifier is preferred for this purpose.

Although the light amplifier tube 431 would operate as a substantially linear amplifier for low intensity light inputs, it is of more interest to consider the operation of the apparatus for relatively high intensity input pulses. By relatively high intensity, it is meant that the pulse intensity is sufficient to substantially depopulate the higher energy level at a given point before the entire pulse wave-train passes this point in the light amplifier tube. Under such conditions it will be apparent that while the first portion of the input wave-train of light will be amplified to a substantial extent, the trailing portion of the wave-train will not be amplified or will be only slightly amplified.

As the pulse passes through the light amplifier tube 431, this effect will be highly cumulative for as the intensity of the leading portion of the wave-train is built up it will tend to more completely and more rapidly depopulate the upper energy level in the volume through which it passes so that there will be effectively an exponential growth of the intensity of the leading portion of the pulse together with a generally corresponding shortening of the pulse due to the lack of amplification of the trailing portion of the pulse wave-train.

From the foregoing explanation, it will be seen that the non-reflecting light amplifier tube 431 produces a great intensification of the input pulse, together with a considerable shortening of the pulse length. The shortening of the pulse length which can be obtained is limited by the fact that the Fourier transform of a short pulse contains frequency components far removed from the nominal frequency. Thus, as the pulse becomes shorter and shorter, the energy in the pulse will cease to be concentrated at the nominal frequency; as a result the efficiency of the process will deteriorate, thus limiting the shortening of the pulse which can be obtained. Due to this effect and for other reasons, it is unlikely that a pulse length shorter than several hundred cycles of the light frequency can be obtained, no matter how long the non-reflecting amplifier tube is made.

It should be noted that the operation of the non-reflecting light amplifier tube comes somewhat more complex when the transition becomes "power broadened." These different effects are of consequence when the time required for the wave-train length to pass a given point is less than the phase relaxation time. The various effects produced under this condition will not be discussed in detail. It will suffice to say that under these conditions the pulse passing through the non-linear light amplifier tube will continue to grow shorter and denser. One minor effect is that the peaking action on the input wave form will be somewhat delayed so that the peak will be formed somewhat behind the leading edge of the input pulse wave-train.

Short light pulses such as those obtained from the pulsed resonant light amplifier and even shorter pulses obtainable from the non-reflecting light amplifier tube are useful for various purposes and in various systems, some of which will later be explained in some detail.

The apparatus of FIG. 16 by itself would be useful in the field of high speed photography. The length of pulse obtainable with apparatus as shown in FIG. 16 may be as short as the order of $10^{-12}$ seconds. The ability of a pulse of this short length to "stop" action can be appreciated by the fact than an object traveling at the speed of light would be stopped within one millimeter by such a short pulse of light.

Although the total amount of light energy may be somewhat smaller than conventional photographic light sources, this would not be a serious limitation, and particularly so in the field of microphotography, for example, where only a small area need be illuminated. The fact that the output from the non-linear light amplifier has very nearly plane waves makes it possible to focus the output to as small an area, as would be desired for microphotographic purposes.

*Light energy machining apparatus*

A system is shown in FIG. 17 including light powered machining apparatus together with control means for highly accurate control of the machining apparatus. The light powered machining apparatus will desirably include either a pulsed resonant light amplifier or a nonresonant pulsed light amplifier as discussed above (or both).

The characteristic of the output from resonant light amplifiers as previously described, namely that the light energy output constitutes nearly planar waves, makes it possible to focus the output in a very small spot, as previously explained. The area of the focusing spot may approach one square wave length under ideal conditions. The heating effect of such an intensely focused beam of energy is such that ordinary materials and even highly heat-resistant materials will be virtually instantaneously vaporized and/or disassociated when placed at the focus of the beam. Thus, a highly efficient and heretofore unequalled cutting and machining instrument may be provided by the use of focused light from a resonant light amplifier. The operability of the machining apparatus does not depend upon the ability to focus the beam to a spot approaching only one square wave length in area. The apparatus will be highly effective even though the focal spot is much larger.

The heating power for the machining apparatus of FIG. 17 is provided by a pulsed light amplifier 441. The output beam from the pulsed light amplifier 441 is indicated by arrows 443 which are directed by a mirror 442 to a converging lens 444. The means for directing and converging the beam, are of course, merely illustrative and other means such as a parabolic mirror could alternatively be utilized.

The beam indicated by arrows 443 is controllably directed by a rotatable mirror 445. The mirror 445 is pivoted to rotate about an axis perpendicular to the plane of the paper indicated at 446 and is also pivoted to rotate about the axis of a shaft 447. The shaft 447 is rotated by a motor 448. The mirror 445 is also motivated to oscillate about the axis 446 by suitable motive means which have been omitted for simplicity in the schematic diagram of FIG. 17. A workpiece is placed in the path of the beam indicated by arrows 443, the workpiece being illustrated as a flat plate 449 in FIG. 17, although the nature of the workpiece upon which the machining is to be performed is obviously not limited to such flat material.

The workpiece 449 is located so that the focal point 451 of the beam 443 strikes the workpiece. Accordingly, the workpiece 449 will be etched or cut through due to evaporation of the material by the beam 443. A cut in the workpiece 449 is indicated at 452. The portion of the workpiece 449 which is cut or etched will be controlled by the control circuit 453 which controls the pulsing of the light amplifier 441. The pulsed light amplifier 441 may be controlled to produce single pulses under control of the control circuit 453, but it will generally be more efficient to produce a series of pulses in order to remove material from the desired area of the workpiece at a high rate of speed.

It should be noted that a continuously operating resonant light amplifier could be used in place of the pulsed light amplifier 441 but the latter is preferred from the point of view of efficiency and effectiveness.

To control the cutting operation performed with the energy supplied by the pulsed light amplifier 441, it is desirable to utilize a control system also incorporating a resonant light oscillator. The use of a resonant light oscillator in the control system for the machining operation provides a light probe for scanning a template which has a resolution comparable to the resolution of the cutting beam itself. It is possible, however, to utilize any other suitable control system for the cutting apparatus previously described.

The control system of FIG. 17 comprises a light oscillator 454, the output beam of which is indicated by arrows 456. It is not necessary for oscillator 454 to be pulsed, but it could be so operated if desired. The beam is directed by means of a partially reflecting mirror 455 so that a portion 457 of the beam 456 passes through a converging lens 458. The beam 457 is controllably directed by means of a rotating mirror 459 pivotally mounted about an axis 461 and on a rotatable shaft 462, which is rotated by a motor 463, all in a fashion similar to that previously described with respect to the apparatus for controlling the cutting beam.

The motor 463 for controlling the light probe of the control system is synchronized with a motor 448 controlling the cutting beam 443, although the motors need not necessarily be arranged to run at the same speed as it may be desired to have the scale of the pattern cut on the workpiece 449 either larger or smaller than the control pattern. The movements of mirrors 445 and 459 about axes 446 and 461 are also synchronized. The beam 457 is directed on a reflecting template 464, the focal point 465 of the beam falling approximately on the surface of the template. The template 464 may comprise a dark line drawn on a reflecting surface or vice versa.

Light is reflected from the template 464 back to the mirror 459 and through the lens 458 and through the partially reflecting and partially transparent mirror 455 to a converging lens 466 where it is directed on the sensitive surface of a photodetector 467.

As the mirror 459 is rotated by the motor 463 and oscillated about the pivot 461, it will scan the reflecting template 464. Whenever a mark on the template 464 is traversed by the focal point 465, a sharp change in the intensity of the reflected light to the photodetector 467 will be produced. The output of the photodetector 467 is supplied to the control circuit 453. The control circuit 453 is arranged to operate the pulsed light amplifier in response to a decrease in reflected light intensity caused by the passage of the focal point 465 over a dark line on the template 464. Alternatively, the control circuit could be arranged to detect changes in light intensity or to respond to increased light intensity or to respond in any other desired manner to the characteristics of a template.

From the foregoing explanation, it will be seen that machining apparatus of a novel type having capabilities beyond those of previously known apparatus is provided by the above-described apparatus. It will be obvious that the principles explained by the simple example of FIG. 17 may be extended to machining operations in three dimensions.

The control system of FIG. 17 could obviously also be modified to incorporate servo control or "feedback" control to cause the sensing light beam to follow a line or edge of the template. By such an automatic feedback control, the beam could also be kept fixed on a reflecting point on a moving object. By means of such a servo controlled sensing system, and a suitable control circuit, the motion of a moving object, such as a machine tool, may be controlled.

Alternatively, the position or orientation of an apparatus with respect to the moving object may be controlled. Thus, any type of tool, such as the pulsed light tool illustrated in FIG. 17, for example, could be positioned in correspondence with the motion of the workpiece, or a moving template or any other moving object.

It is clear that the light beam from a resonant light amplifier provides a highly accurate and flexible probe for sensing the positions of a great variety of objects and thereby provides the means for a correspondingly accurate automatic control of apparatus.

Another illustration of the use of a pulsed light amplifier for a machining operation is shown in FIG. 18. A pulsed light amplifier 471 is shown schematically having an output beam 472 which is focused by a converging lens 473. The beam 472 is focused at a point 474 on the surface of a rotating workpiece 475.

In order to dispose of the debris from the evaporation process, a gas blast is provided from a nozzle 476. The light source and associated equipment is protected by a transparent shield comprising a transparent plate 478 rotated about the axis of a shaft 479 by a motor 481.

The transparent plate 478 is itself protected by a liquid stream provided from a conduit 482. The liquid is preferably transparent and may, for example, be water.

The liquid flow onto the rotating plate 478 will spread out in a thin film due to centrifugal force, and being tarnsparent, will not interfere with the transmission of the light beam through the transparent plate 478 and onto the workpiece 475.

FIG. 18 illustrates one of the possible variations in the use of the pulse light amplifier as a cutting or machining device. In addition, techniques utilized in machining operations in general are applicable to the above-described apparatus utilizing light energy for cutting and machining.

Apparatus similar to that shown in FIG. 18 may be in part enclosed in a vacuum-tight envelope for the purpose of evaporating material to be condensed on another object; that object could be a mirror, for example.

*Light oscillating heating apparatus*

In FIGURE 11, heating apparatus is shown utilizing a resonant light oscillator 261 having a suitable power source 262. As previously explained, the output of such an oscillator produces a beam of very nearly plane light waves, that is, their convergence or divergence is exceedingly small.

As a consequence of this characteristic of the output of resonant light oscillator, the beam is capable of being focused to a very fine point. In FIGURE 11 the output beam 263 is focused by means of mirror 264 on a target 266. Apparatus may be provided for maintaining a target in the focal spot, particularly in the event that the target is a liquid or gas.

Light energy in or near the visible spectrum has been utilized to produce high temperatures in previously known apparatus. For example, light from the sun has been used in conjunction with focusing mirrors to produce a high temperature heat source for research purposes. Although a large quantity of heat can be produced in this manner, the area within which it may be focused remains relatively large due to the large angle subtended by the sum.

Another approach to produce a high temperature by focusing light energy involves the use of a near-point-source of energy such as an electrical arc between carbon electrodes, for example. Such an approach is also limited by the fact that the so-called point source of energy is of finite extent and generally must be increased in size as greater power outputs are produced. It can be shown from the second law of thermodynamics that an object heated by incoherent radiation cannot become hotter than the source of the radiation.

The resonant light oscillator produces a coherent beam which is divergent only by an amount on the order of one (1) part in $10^5$; and thus is capable of being focused within an extremely small volume. Such a beam could be focused at nearby distances on a spot having an area on the order of one (1) wavelength squared. At greater distances the smallness of the focused spot is limited to the size of the Fraunhofer diffraction pattern. The energy intensity obtainable with moderate amounts of power by such apparatus is greatly in excess of any previously obtained radiation intensity. Such apparatus has obvious application both for research and in practical applications.

In some applications this type of heating by focusing the light oscillator beam into a small intense spot has unique advantages. For example, it is often desirable to produce chemical reactions which must be produced at high temperatures; in such cases it is sometimes desirable that after being heated to a high temperature, that the material being processed thereafter be rapidly lowered in temperature. An example of such a reaction is the reaction between nitrogen and hydrogen, $N_2 + 3H_2 \rightarrow 2NH_3$. This reaction can be promoted at a high temperature, but if the reaction product is allowed to cool slowly it will disassociate and revert to the original components thus achieving its low temperature equilibrium condition. Utilizing the apparatus of FIGURE 11 however, it is possible to move the reactants in and out of the volume wherein the heating is concentrated very rapidly thus raising the reactants to high temperature and cooling it rapidly and thereby causing it to remain in its high temperature equilibrium state producing the desired compound.

Obviously the apparatus of FIGURE 11 may also be utilized to produce the disassociation of materials through the creation of very high temperatures.

Certain high temperature reactions which may be induced by use of the heating apparatus of FIGURE 11 are exothermic, that is, they result in the production of heat energy. Thus in some instances the heating apparatus of FIGURE 11 may be utilized for the production of energy in the form of heat as well as for creating useful products of chemical reactions. An example of an exothermic reaction taking place at high temperature is the combination of aluminum and oxygen to produce $Al_2O_3$. A useful product of this reaction is synthetic sapphires.

An alternative form of apparatus for concentrating light energy for the purpose of heating or for other useful purposes is shown in FIGURE 19. The apparatus shown in FIG. 19 is particularly adapted to the concentration of light energy on a liquid target material and is shown in somewhat more detail than the schematic showing of heating apparatus in FIGURE 11. The apparatus of FIGURE 19 will be explained as it is utilized for the production of X-rays by subjection of a liquid material to high temperature and high light intensity. It will be understood however that this apparatus is also susceptible of use for promoting reactions to obtain useful products or to obtain heat energy.

The apparatus of FIGURE 19 comprises a light oscillator 501 having an output beam of light indicated by arrows 503. The oscillator 501 may be of a resonant type, thus having an output which is comprised of nearly planar waves which can be focused into an exceedingly small volume and accordingly provide a high intensity. In some instances it may be preferred to use a pulsed resonant light oscillator for the oscillator 501. This allows a still higher energy intensity to be obtained by reason of the concentration of energy in short pulses, as was explained in the explanation of the pulsed light amplifiers and oscillators. A still higher intensity may be obtained by using a pulsed nonresonant amplifier in conjunction with a pulsed resonant oscillator as explained in the discussion of FIGURE 16.

The output from the light oscillator 501 is concentrated by a lens 502. Obviously a mirror may be used rather than the lens 502 for the concentration of the light beam if desired.

An enclosure 504 is provided within which the light beam is concentrated. A window 505 is provided in the enclosure for entrance of the light beam. A protective shield is provided for the window 505 comprising a rotatable transparent member 506 which is mounted on a shaft 507 and rotated thereupon by motive means not shown.

The shield 506 is provided with a protective film of non-volatile liquid from a conduit 508. The film of liquid prevents damage to the shield 506 which would degrade its transmissivity and at the same time the film of liquid is transparent to the light beam.

The interior of the enclosure 504 is substantially evacuated by a vacuum pump 509. Accordingly the energy of the light beam can be concentrated and dissipated almost entirely in the liquid target rather than being partially dissipated by an atmosphere within the enclosure 504. The target for the production of X-rays by excitation by the light beam 503 may comprise gallium, mercury or any other suitable X-ray emitting material. In FIGURE 19 the liquid is illustratively represented as mercury.

A quantity of mercury 511 is pumped through a conduit 516 by a pump 515 where it is cast upon a rotating disk 512. The disk 512 is rotated on a shaft 513 by means of a motor 514. The mercury is spread into a thin sheet by the centripetal force due to the rotation of the disk 512. The mercury is projected from the edge of the disk still in a sheet 517 so that the focal point 518 of the light beam 503 strikes substantially on the projected sheet of mercury 517.

X-rays indicated by arrows 519 are produced by excitation of electrons from the lowest levels of the atoms or ions of the target substance (Hg in FIG. 19) either directly by the photons of light or by creation of high temperatures with resulting particle collisions.

The X-rays may be produced within a very small volume yielding a near point source. The more nearly the source approaches a point source the higher the resolution which is possible in X-ray photography and other applications of the X-rays produced.

The arrangement shown in FIGURE 19 provides a liquid target at the focal point of the light beam which is not supported by physical structure. The problem of damage of physical structure by close proximity of the focal of the light beam is thereby further reduced. Furthermore, the mercury surface presented at the focal point of the light beam is rapidly moving and continuously refreshed so that mercury particles which have been excited by the light beam with resulting vaporization, disassociation or impartation of high velocity are replaced by a new mercury surface which provides a suitable target for the concentrated light beam.

As previously explained the apparatus of FIGURE 19 may readily be adapted for processes other than the production of X-rays. For example other types of radiation may be produced or other types of reactions may be promoted as previously explained in connection with FIGURE 11.

Although the apparatus of FIGURE 19 is shown and described as particularly adapted to excitation of a liquid target material, it is obvious that a gaseous target material could be utilized by simply replacing the means for projecting a liquid sheet by a suitable means for projecting a gaseous stream, such as a nozzle, or by filling the whole of chamber 504 with a suitable gas (e.g., xenon). It should also be noted that the target material need not be a single element or substance by may comprise a combination of elements or substances which are to take part in a reaction promoted by the exciting light beam.

From the foregoing it will be seen that the apparatus of FIGURE 11 and of FIGURE 19 and apparatus utilizing similar principles is particularly adapted for the creation of high temperatures generally in a very small volume in order to promote reactions of various types to produce particular reaction products, to produce energy from the target material, or to convert the light energy into X-ray radiation or other higher frequency forms of radiation.

From the preceding detailed description of applicant's invention with its various features, it will be seen that light amplifier apparatus and systems incorporating such apparatus are provided which are useful for widely diversified purposes which provide advantages in the fields of communication, distance measurement, time measurement, and production of high temperatures, to name a few, which have heretofore not been possible to achieve. In addition to the variations and modifications to applicant's disclosed apparatus which have been suggested, many other variations and modifications will be apparent to those skilled in the art and, accordingly, the scope of applicant's invention is not to be construed to be limited to the particular embodiments shown or suggested but is rather to be limited solely by the appended claims.

What is claimed is:

1. Apparatus for generating radiation of higher frequency than that of light, comprising a light generator for generating nearly planar light waves, for focusing said light waves into a small volume, means for maintaining a liquid substance in the path of said light waves comprising a quantity of liquid, means for continuously supplying a volume of said liquid not directly supported by a solid structure to said small volume thereby causing an excitation of the innermost electrons of the atoms of said substance and converting a substantial amount of the light energy to higher frequency radiation.

2. Apparatus as claimed in claim 1 wherein the means for supplying a volume of liquid comprises a disk, means for rotating said disk and means for flowing said liquid on said disk to be thrown from said disk by centrifugal force in a substantially continuous sheet.

3. Apparatus as claimed in claim 2 further including a gas-tight housing surrounding said means for supplying a volume of liquid and means for substantially evacuating said housing.

No references cited.

JEWELL H. PEDERSEN, *Primary Examiner.*

R. L. WIBERT, *Assistant Examiner.*